(12) United States Patent
Chen et al.

(10) Patent No.: US 12,468,100 B2
(45) Date of Patent: Nov. 11, 2025

(54) CONNECTOR WITH ALIGNMENT FEATURES

(71) Applicant: Molex, LLC, Lisle, IL (US)

(72) Inventors: Lie Chen, Conway, AR (US); Yu-Da Liu, Dongguan (CN)

(73) Assignee: Molex, LLC, Lisle, IL (US)

( * ) Notice: Subject to any disclaimer, the term of this patent is extended or adjusted under 35 U.S.C. 154(b) by 210 days.

(21) Appl. No.: 18/225,169

(22) Filed: Jul. 24, 2023

(65) Prior Publication Data
US 2024/0036276 A1 Feb. 1, 2024

(30) Foreign Application Priority Data

Jul. 26, 2022 (CN) .......................... 202210887203.1

(51) Int. Cl.
*G02B 6/38* (2006.01)
*G02B 6/42* (2006.01)
*G02B 6/44* (2006.01)

(52) U.S. Cl.
CPC ......... *G02B 6/4246* (2013.01); *G02B 6/3897* (2013.01); *G02B 6/4277* (2013.01); *G02B 6/4401* (2013.01)

(58) Field of Classification Search
None
See application file for complete search history.

(56) References Cited

U.S. PATENT DOCUMENTS

| | | | | |
|---|---|---|---|---|
| 7,762,844 B2* | 7/2010 | Ice | ................. | H01R 13/648 439/607.2 |
| 8,183,470 B2* | 5/2012 | Zhang | ................. | H05K 9/0058 439/607.17 |
| 8,641,429 B2* | 2/2014 | Fish | ................. | H01R 13/6658 439/76.1 |
| 8,851,929 B2* | 10/2014 | Sorani | ................. | H01R 13/6658 361/695 |
| 9,104,897 B2* | 8/2015 | Chen | ................. | G06F 21/88 |
| 9,122,030 B2* | 9/2015 | Xie | ................. | G02B 6/4278 |
| 10,530,497 B2* | 1/2020 | Torres | ................. | H04L 12/12 |
| 10,893,215 B2* | 1/2021 | Lavoie | ................. | H04N 21/4312 |
| 10,997,110 B2* | 5/2021 | Lavoie | ................. | G06F 13/4081 |
| 11,223,173 B2* | 1/2022 | Torres | ................. | H01R 31/065 |
| 11,552,873 B2* | 1/2023 | Dai | ................. | H04L 43/0829 |

(Continued)

FOREIGN PATENT DOCUMENTS

| | | |
|---|---|---|
| JP | 2006228701 A | 8/2006 |
| JP | 2018517969 A | 7/2018 |

(Continued)

*Primary Examiner* — Jai M Lee

(57) ABSTRACT

An electronic device is provided with a first connector module configured to mate with an external plug. The first connector module includes a first set of terminals; a first wafer supporting the first set of terminals, a first one or more of the second ends of the first set of terminals are bent to form a first set of tails, and a second one or more of the second ends of the first set of terminals terminate within the first wafer; and a tail alignment structure positioned to support the first set of tails. The electronic device further includes a cable arrangement forming a connection with the second one or more of the second ends of the first set of terminals; a host board configured to form an electrical connection with the first set of tails; and a shield assembly.

15 Claims, 22 Drawing Sheets

(56) References Cited

U.S. PATENT DOCUMENTS

| | | | |
|---|---|---|---|
| 11,688,960 B2* | 6/2023 | Lloyd | H01R 12/79 439/66 |
| 2011/0058777 A1* | 3/2011 | Gazzola | H04L 49/40 385/92 |
| 2015/0155963 A1* | 6/2015 | Tang | H04B 10/40 398/83 |
| 2018/0039411 A1* | 2/2018 | Stenfort | G06F 3/067 |
| 2022/0012206 A1* | 1/2022 | Bross | G06F 13/4072 |

FOREIGN PATENT DOCUMENTS

| | | |
|---|---|---|
| JP | 2019192602 A | 10/2019 |
| JP | 2022512823 A | 2/2022 |
| TW | 201931685 A | 8/2019 |
| WO | 2021067907 A1 | 4/2021 |

* cited by examiner

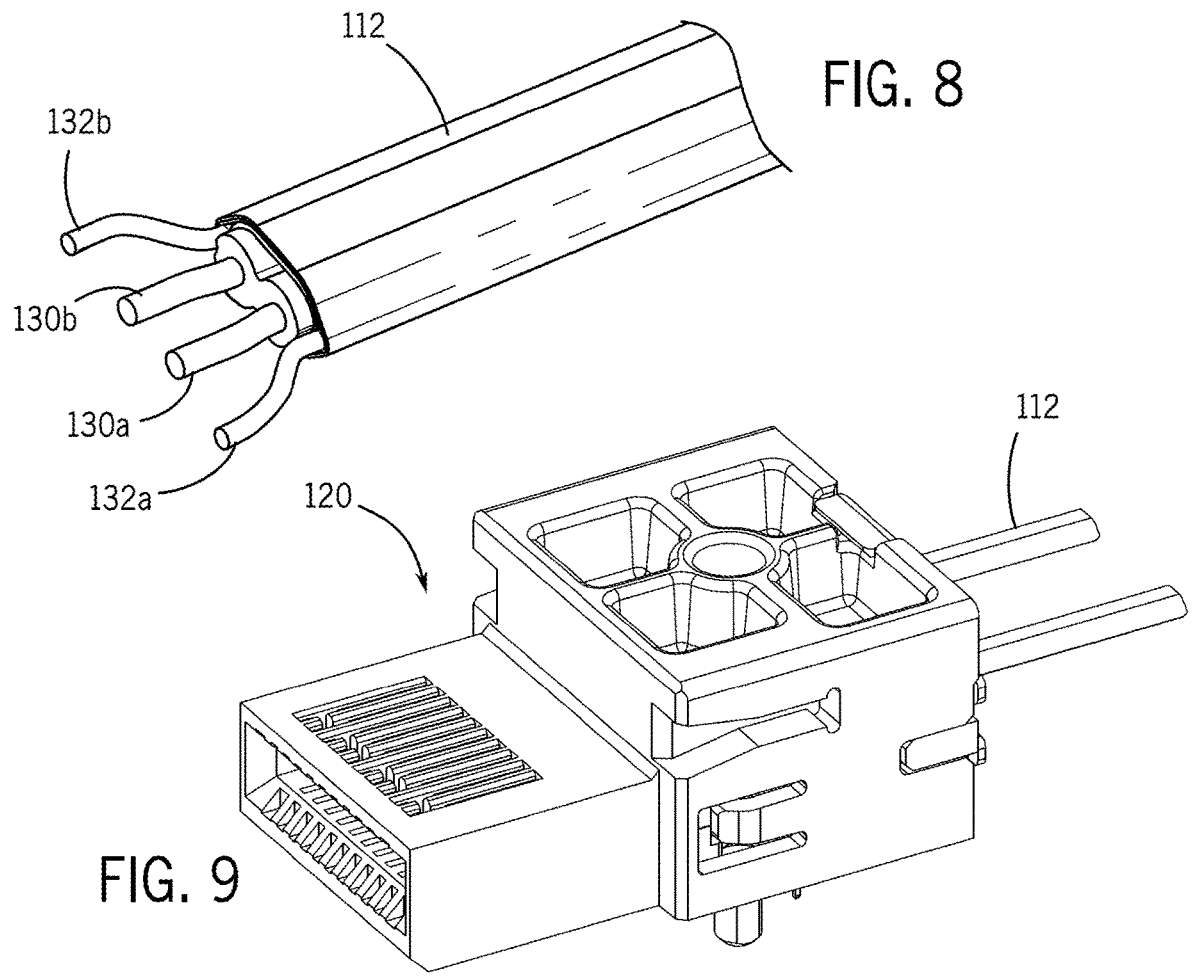
FIG. 8
FIG. 9
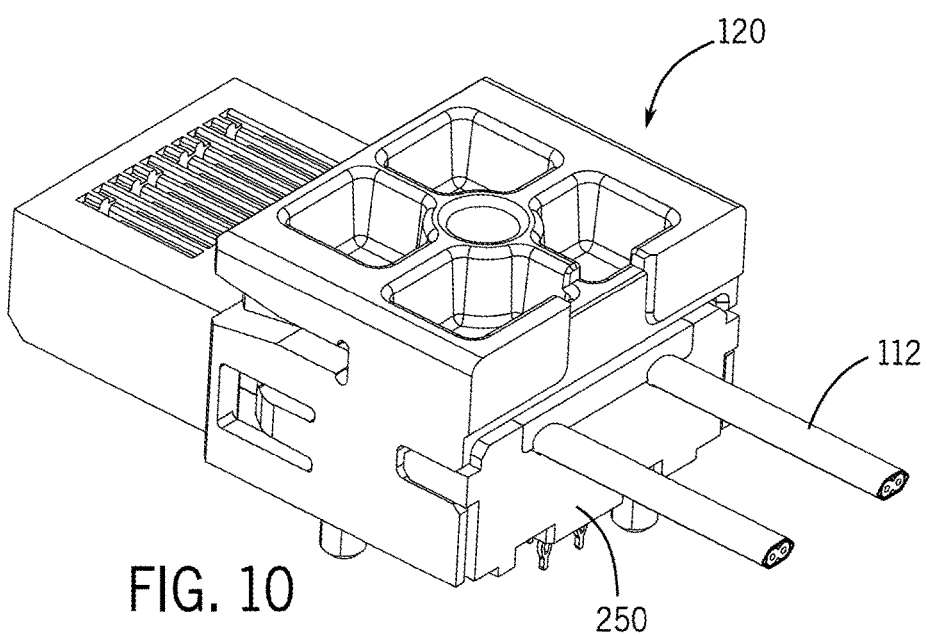
FIG. 10

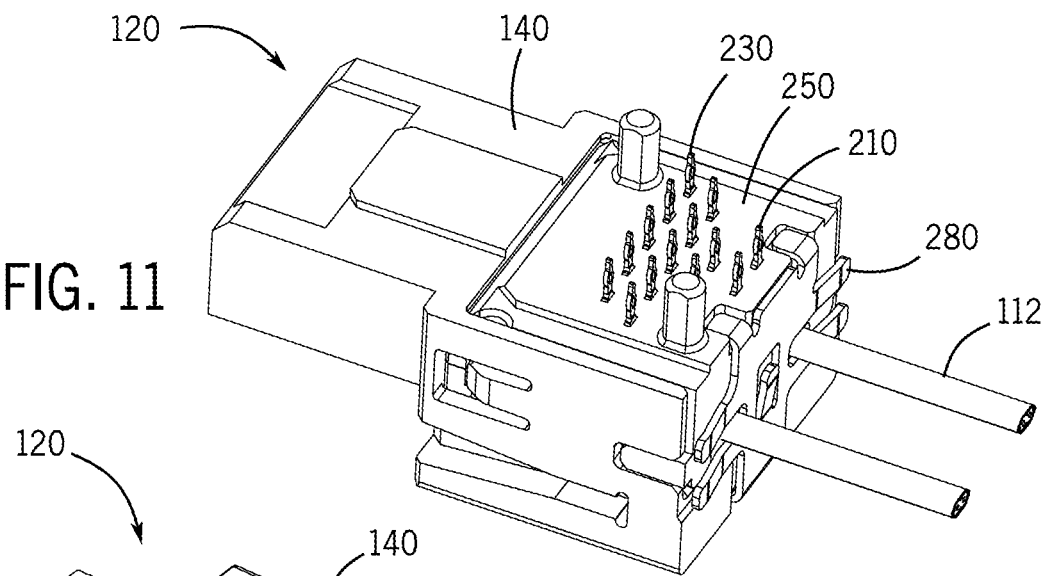
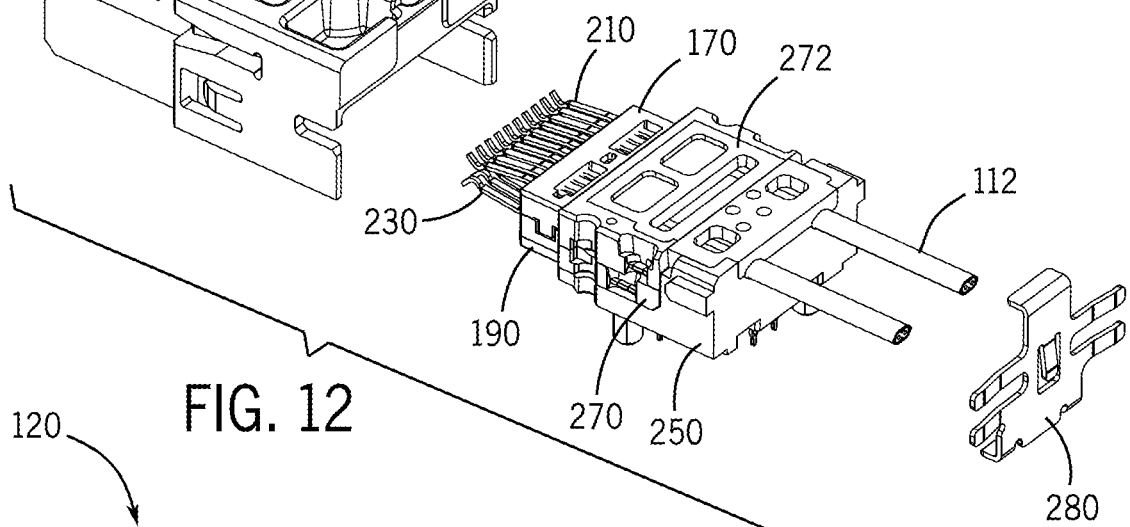
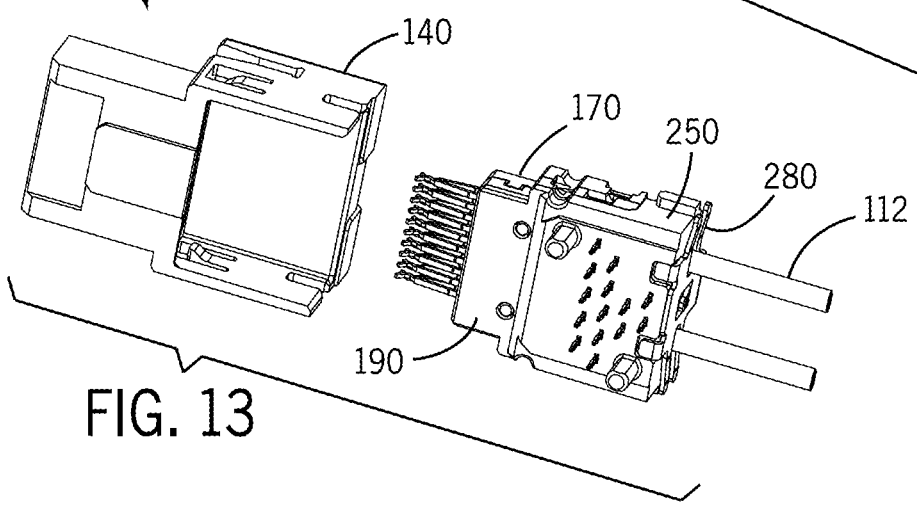

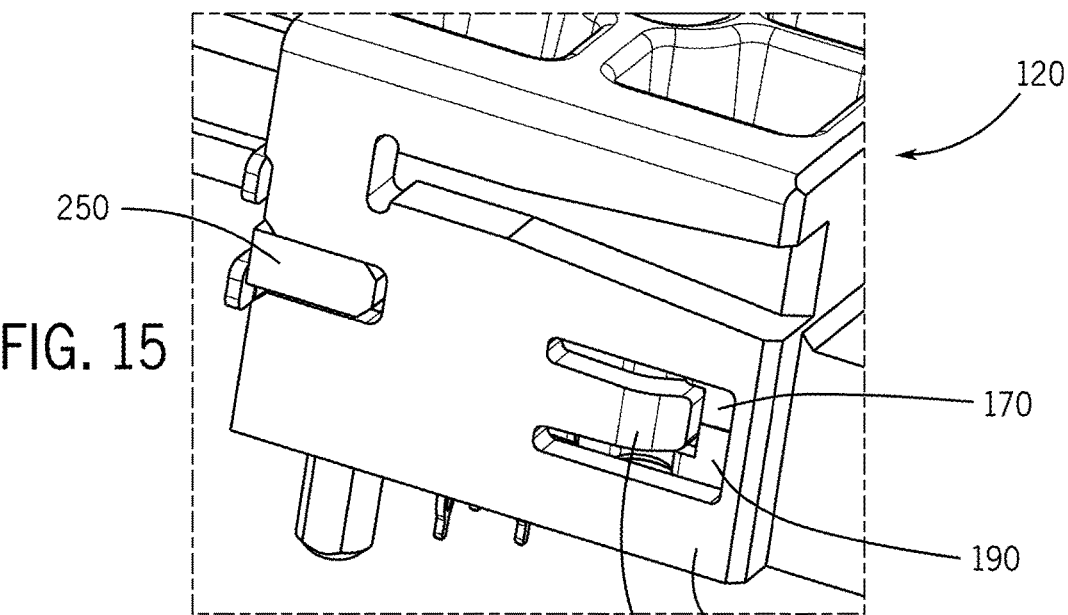
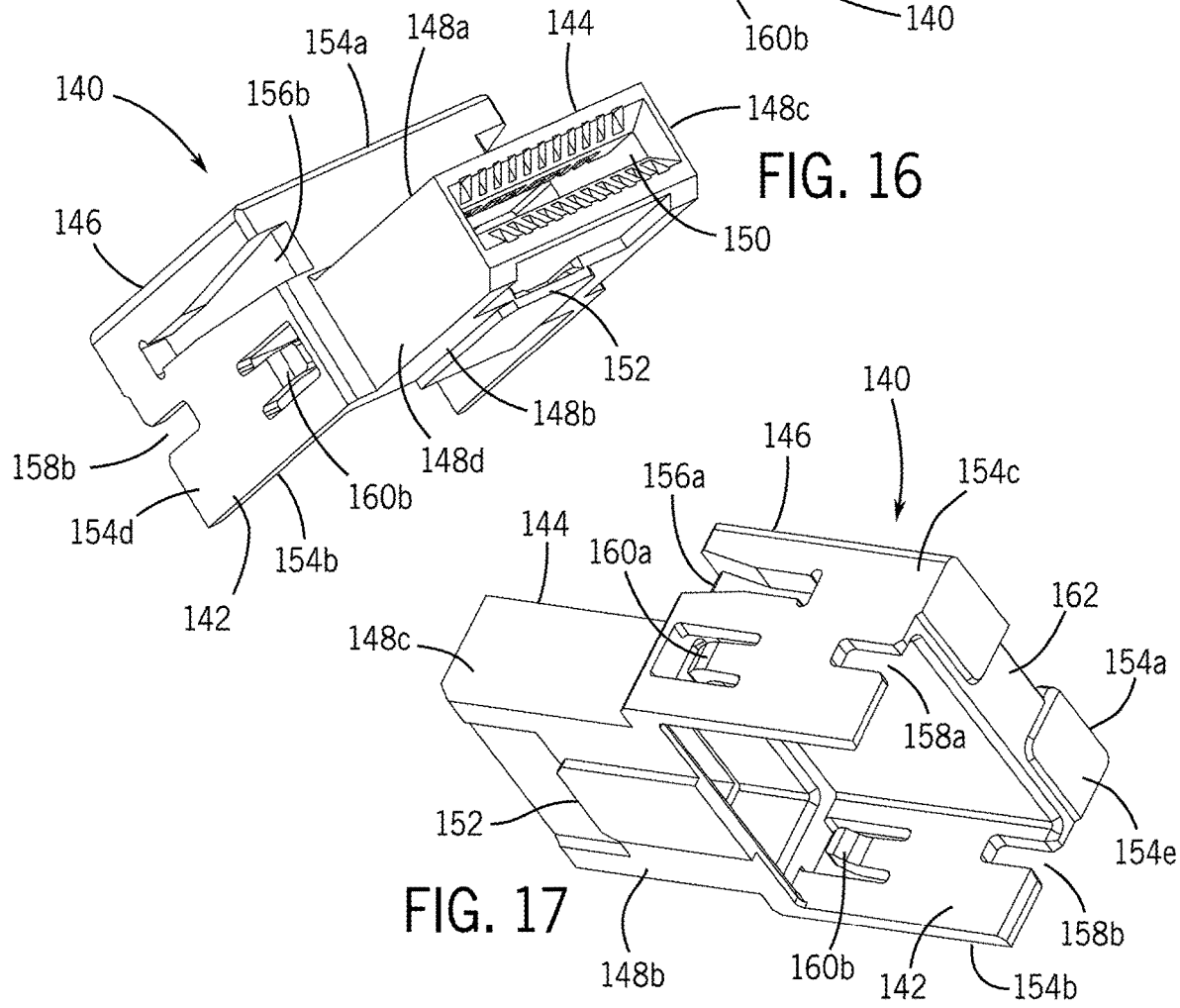

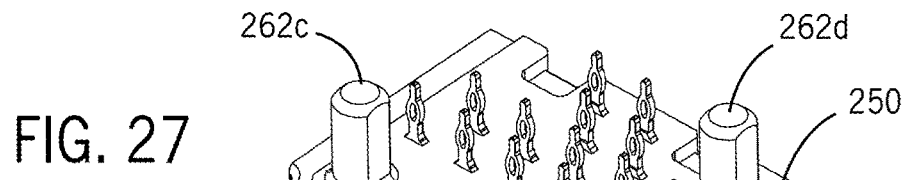
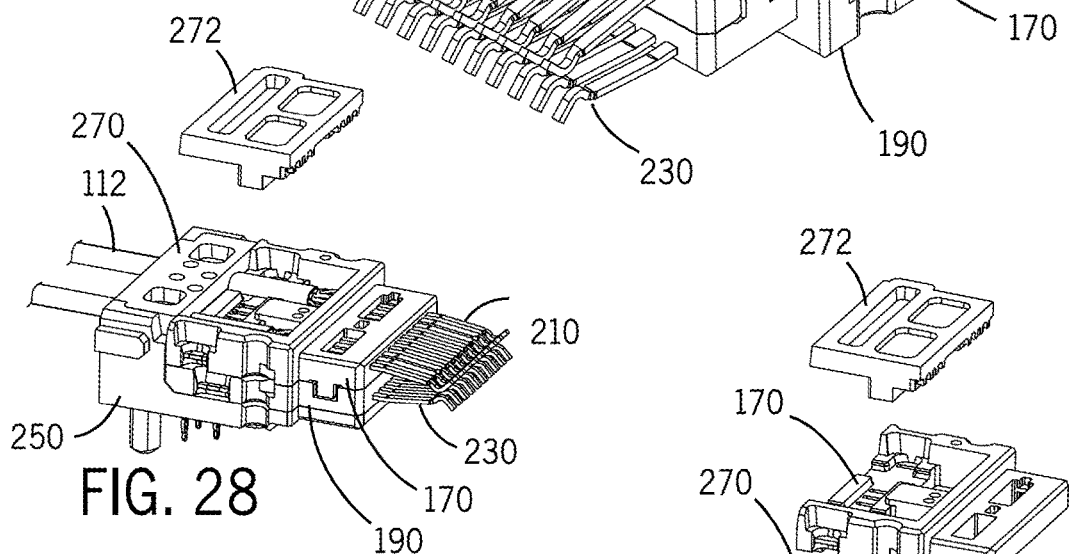
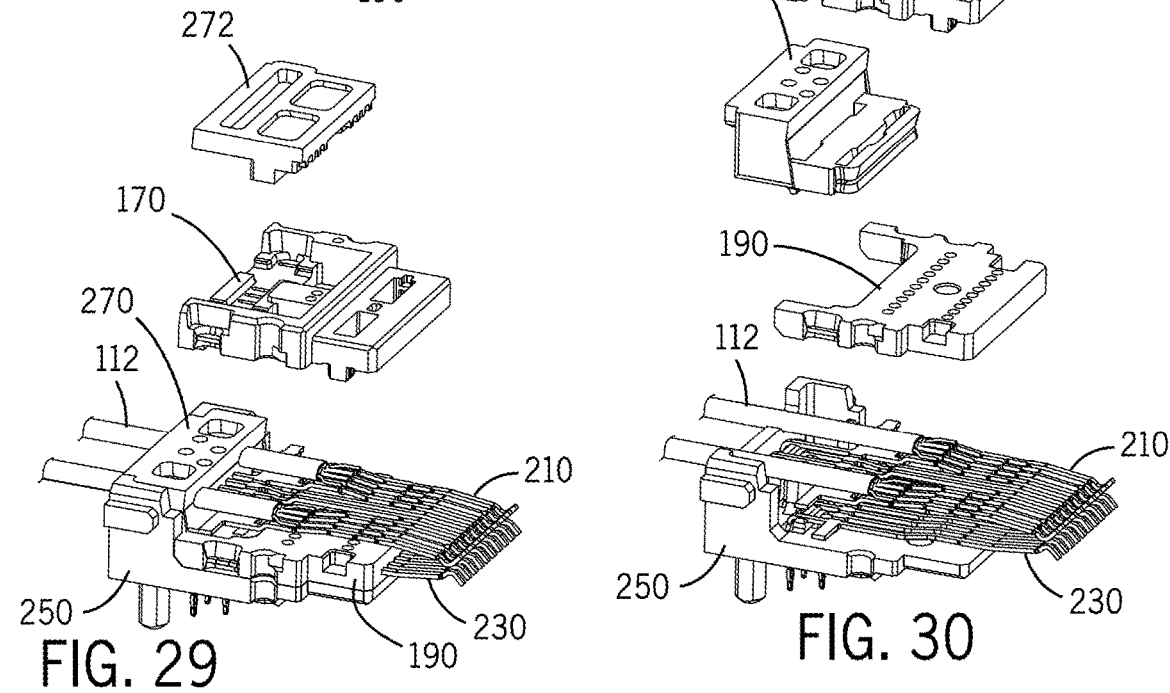

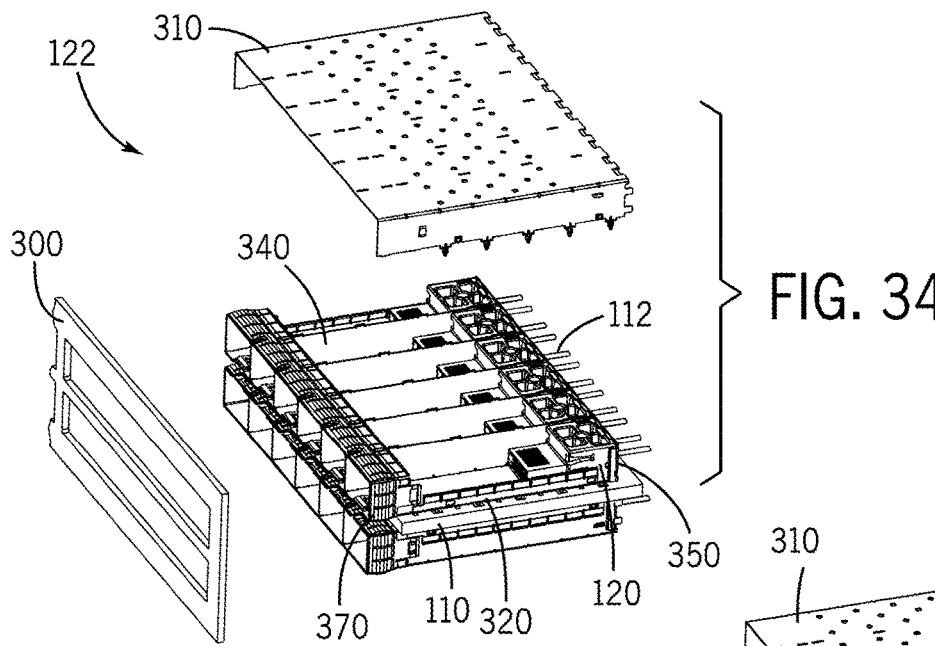
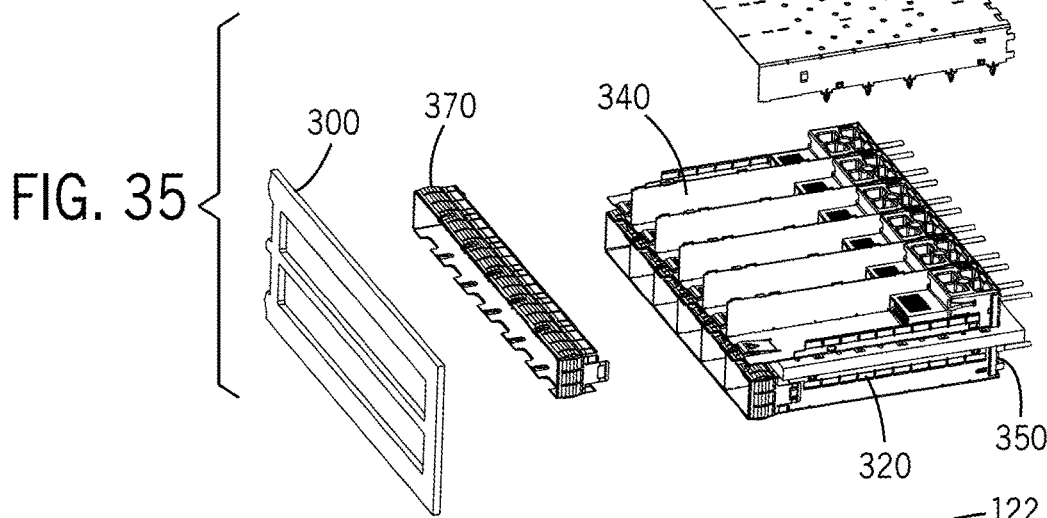
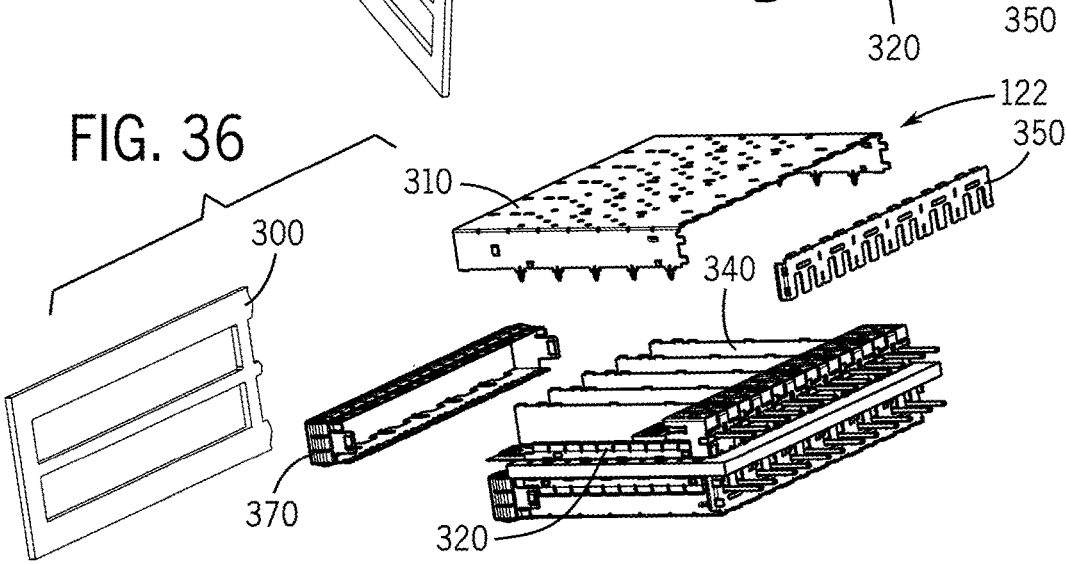

CONNECTOR WITH ALIGNMENT FEATURES

RELATED APPLICATION

The present application claims priority to Chinese patent Application No. 202210887203.1 Jul. 26, 2022 which is incorporated by reference in its entirety.

TECHNICAL FIELD

This disclosure generally relates to electronic devices, and more specifically to electronic devices with shielded bypass connector modules.

BACKGROUND

A small form-factor pluggable (SFP) interface is a compact, hot-pluggable network interface connection module that may be used for various purposes, including telecommunication and data communications applications. Such an SFP interface within an electronic device of a networking hardware system is a modular receptable that is shaped and configured to receive a cable plug, such as from a fiber-optic or copper cable. The electronic device may receive both high speed and low speed signals via the interface, and as such, manufacturers strive to design devices that process all such signals in an efficient manner.

SUMMARY

The disclosure provides an electronic device with shielded bypass connector modules.

In one aspect, the disclosure provides an electronic device with a first connector module with a first longitudinal end, a second longitudinal end, a first normal face, and a second normal face, wherein the first connector module is configured to mate with an external plug at the first longitudinal end. The first connector module includes a first set of terminals, each terminal of the first set of terminals having a first end and a second end; a first wafer supporting the first set of terminals such that the first ends of the first set of terminals are positioned for engagement with the external plug at the first longitudinal end, a first one or more of the second ends of the first set of terminals are bent to form a first set of tails, and a second one or more of the second ends of the first set of terminals terminate within the first wafer; and a tail alignment structure positioned proximate to the first wafer to receive and support the first set of tails as the first set of tails extend out of the second normal face of first connector module. The electronic device further includes a cable arrangement forming a connection with the second one or more of the second ends of the first set of terminals and extending out of the second longitudinal end of the first connector module; a host board positioned proximate to the second normal face of the first connector module and configured to form an electrical connection with the first set of tails; and a shield assembly surrounding at least the first longitudinal end, the second longitudinal end, and the first normal face of the first connector module as the first tails of the first connector module are engaged with the host board.

The details of one or more embodiments are set forth in the accompanying drawings and the description below. Other features and advantages will become apparent from the description, the drawings, and the claims.

BRIEF DESCRIPTION OF THE DRAWINGS

FIG. 8 is an end view of a cable that may be incorporated into the electronic device of FIG. 1 according to an example embodiment;

FIG. 9 is a first isometric view of a bypass connector module that may be incorporated into the electronic device of FIG. 1 according to an example embodiment;

FIG. 10 is a second isometric view of the bypass connector module that may be incorporated into the electronic device of FIG. 1 according to an example embodiment;

FIG. 11 is a third isometric view of the bypass connector module that may be incorporated into the electronic device of FIG. 1 according to an example embodiment;

FIG. 12 is an exploded view of the bypass connector module of FIGS. 9-11 according to an example embodiment;

FIG. 13 is a further exploded view of the bypass connector module of FIGS. 9-11 according to an example embodiment;

FIG. 15 is a closer side view of the bypass connector module of FIGS. 9-14 according to an example embodiment;

FIG. 16 is an isometric view of a module housing of the bypass connector module of FIGS. 9-15 according to an example embodiment;

FIG. 17 is a further isometric view of the module housing of the bypass connector module of FIGS. 9-15 according to an example embodiment;

FIG. 27 is a further isometric view of at least portions of the bypass connector module of FIGS. 9-15 according to an example embodiment;

FIG. 28 is a further partially exploded view of at least portions of the bypass connector module of FIGS. 9-15 according to an example embodiment;

FIG. 29 is a further partially exploded view of at least portions of the bypass connector module of FIGS. 9-15 according to an example embodiment;

FIG. 30 is a further partially exploded view of at least portions of the bypass connector module of FIGS. 9-15 according to an example embodiment;

FIG. 34 is a partially exploded view of at least portions of a shield assembly of the bypass connector module of FIGS. 9-15 according to an example embodiment;

FIG. 35 is a further partially exploded view of at least portions of the shield assembly of the bypass connector module of FIGS. 9-15 according to an example embodiment;

FIG. 36 is a further partially exploded view of at least portions of the shield assembly of the bypass connector module of FIGS. 9-15 according to an example embodiment;

Like reference symbols in the various drawings indicate like elements.

DETAILED DESCRIPTION OF PREFERRED EMBODIMENTS

Figure 1:
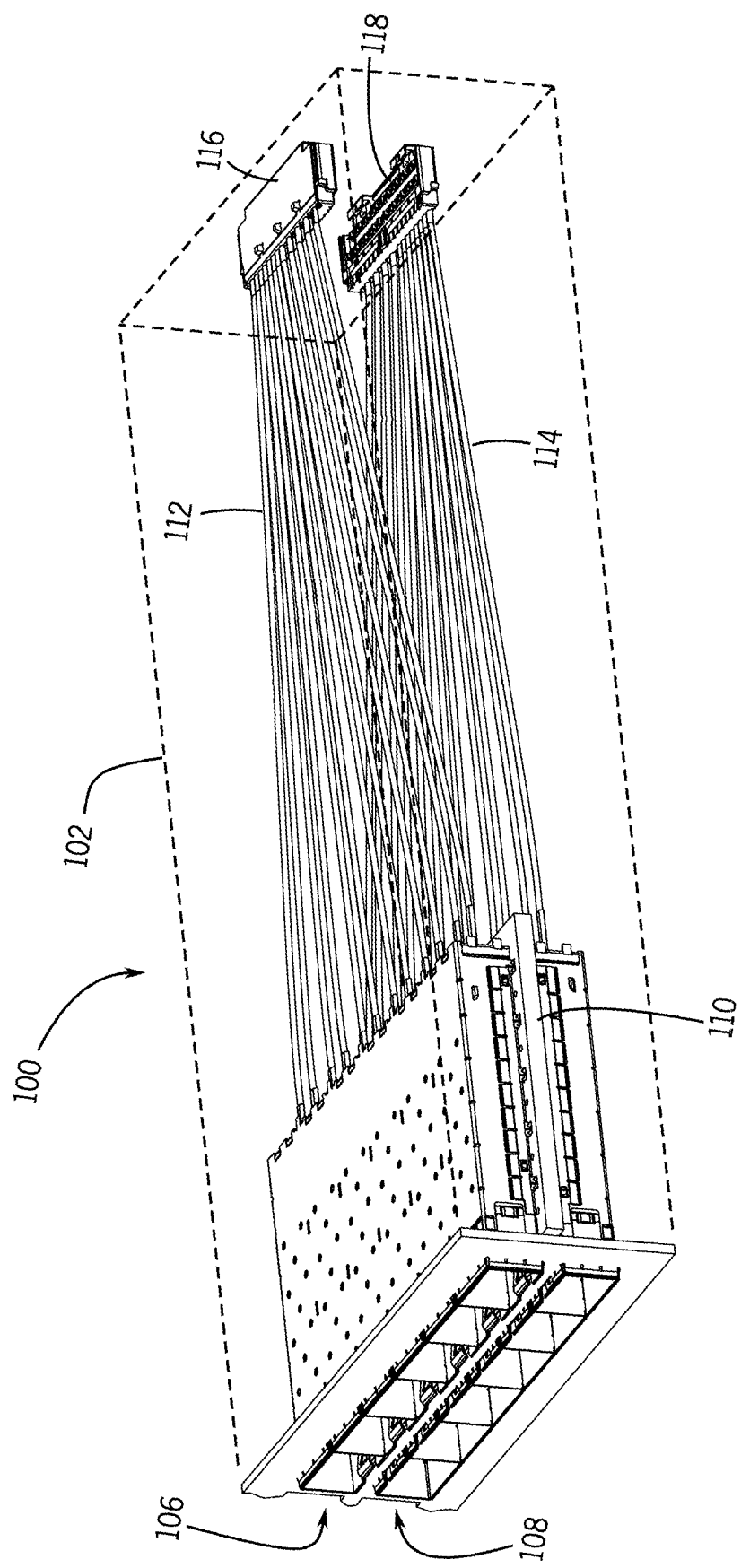
FIG. 1 is a partially schematic isometric view of an electronic device with a bypass connector module according to an example embodiment.

The following describes one or more example embodiments of the disclosed electronic devices with shielded bypass connector modules, as shown in the accompanying figures of the drawings described briefly above. Various modifications to the example embodiments may be contemplated by one of skill in the art.

In the embodiments discussed herein, representations of directions (e.g., up, down, front, forward, side, upper, lower, distal, and rear) may be used for explaining the structure and orientations of the various elements, but these representations should be considered as relative to one another in the particular examples and should not be considered as absolute limitations. Similarly, an orientation convention that references longitudinal (e.g., along an extended or x-axis), lateral (e.g., side to side, along a y-axis, orthogonal to the longitudinal orientation), and normal (e.g., up and down, along a z-axis, orthogonal to the longitudinal and lateral orientations) should be considered internal relative descriptions, not absolute orientations. Moreover, as can be appreciated, some the discussion that follows relates to signal transmission. Signals are often referred to as low speed or high speed by persons of skill in the art, depending on the data rate (low data rates being referred as low speed data or signals and high data rates being referred to as high speed data or signals), and such references should be considered within the appropriate context.

Typically, input/output (I/O) interfaces of electronic devices in networking or communications equipment receive data at plug receptacles and route such data to surface mounted terminals on a printed circuit board (or host board) for processing and/or transmission. With increasingly higher speed demands, the interconnections on and within the host board may become a bottleneck to challenge the ability of the electronic device to effectively distribute the signals.

According to the disclosure described herein, electronic devices may use an array of shielded bypass connector modules to receive and transfer high speed and low speed data in a "hybrid" manner in which a portion of the data (e.g., the low speed data) is directed to the host board and the other portion of data (e.g., the high speed data) is directed other connections, off the host board, thereby avoiding overloading or being limited by the host board.

As an example, the bypass connector module may be configured as a small form-factor pluggable (SFP) connection for various applications. Such connector modules may be formed by stacked wafers supporting terminal sets, solidified by overmold portions, arranged within a tail alignment structure, and housed within a module housing. High speed cables (typically, twin-ax cables) are connected to appropriate terminals within the wafers to direct the high speed signals to a selected, more favorable location off the host board (e.g., to a network connection) while other terminals within the wafer are bent at approximately 90° into tails that extend through the tail alignment structure and out of the lower surface of the bypass connector module. The terminals tails are configured to mate via eye-of-the-needle (EON) connections with the host board. As such, the high speed signals may be connected to high speed cables to avoid the host board, while the low speed signals may be mounted to the host board, thereby resulting the "hybrid" or "bypass" nature of the connector module. Such hybrid or bypass dual delivery enables the accommodation of diverse signals, reduces host board density, and supports remote high speed signal transmission.

Embodiments depicted herein are suitable for use with high speed data signal transmission line systems that support high data rates at low losses from chips or processors and the like. Such a configuration is helpful for what is considered high speed data applications above 10 Gbps or higher, including 112 Gbps applications.

In addition to the hybrid connector modules providing more favorable distribution of signals, the groups of connector modules may be shielded with one or more shield assemblies that cover all six sides of the array of connector modules (e.g., front, rear, top, bottom, and each lateral side), as well as in between the individual modules. Such shield assembly elements may overlap and cooperate to improve EMI performance of the electronic device.

Reference is now made to FIG. 1, which is a partially schematic isometric view of an electronic (or computing) device 100, such as a switch, router or the like. Generally, the electronic device 100 has a device housing 102 (schematically shown) to at least partially house the various components described herein. As an introduction, additional reference is made to FIGS. 2 and 3, which are respectively a partial, closer front isometric view of the electronic device 100 and a partial, closer rear isometric view of the electronic device 100, each with the housing 102 removed.

Figure 2:
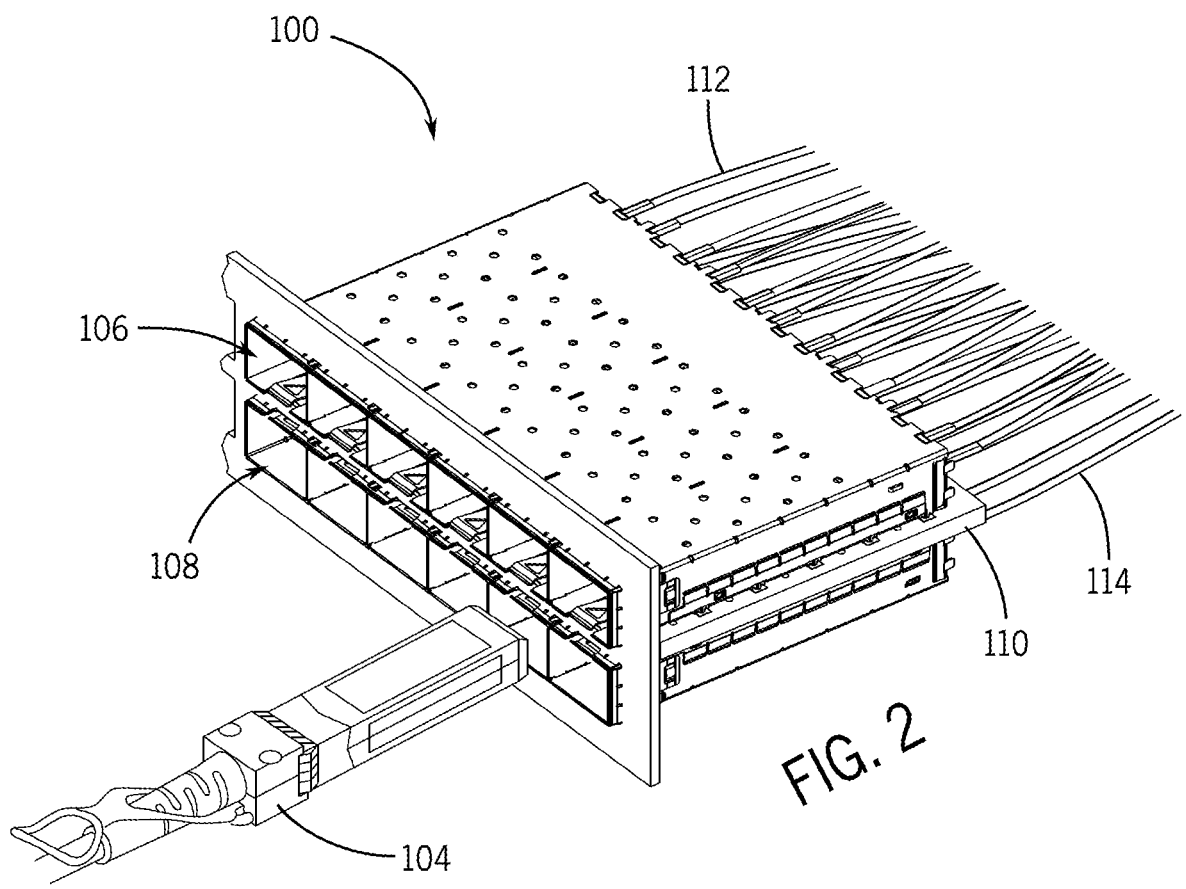
FIG. 2 is a partial isometric view of the electronic device of FIG. 1 according to an example embodiment.
Figure 3:
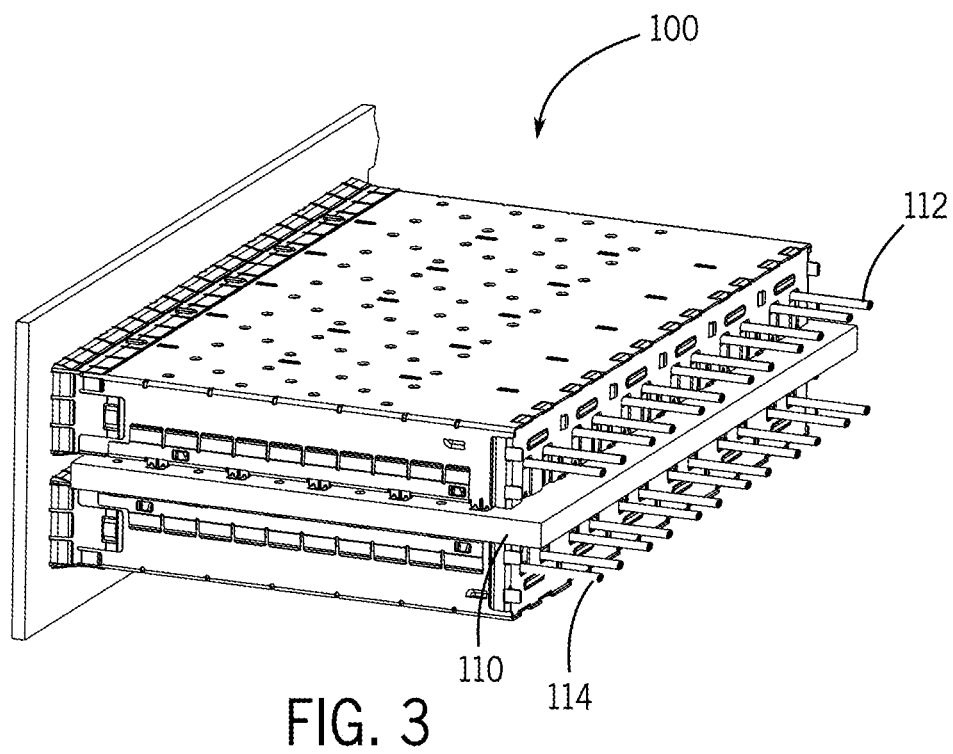
FIG. 3 is a further isometric view of the electronic device of FIG. 1 according to an example embodiment.

The view of FIG. 2 depicts an example plug 104 that may form a physical and electronic connection with the electronic device 100, particularly by inserting the plug 104 into one of an array of plug receptacles 106, 108 formed proximate to a front face of the electronic device 100. Generally, and as described in greater detail below, the electronic device 100 receives and/or exchanges signals or power with a signal or power source provided by the plug 104. The receptacles 106, 108 may form a small form-factor pluggable (SFP) interface, as introduced above.

The electronic device 100 includes a "host board" (or "chip") 110 that broadly refers to an internal, on-board chip or chip package that incorporates one or more processors, or integrated circuits, to facilitate performance of various computing functions. The host board 110 may support an ASIC or any another type of processor or integrated circuit, such as a FPGA and may be one or more separate integrated circuits positioned together on a substrate. Although the host board 110 may have any suitable mechanism for input and output (e.g., solder bumps, contacts, traces, and the like), in one example, the module 120 may interface with the host board 110 with an "eye-of-the-needle" (EON) connection in which pins from the module 120 pass through vias to contacts supported in the host board 110.

A first portion of the signals (and/or power) received at the plug receptacles 106, 108 are transmitted to the host board 110 for further processing, and another or second portion of the signals (and/or power) received by the plug receptacles 106, 108 are not transmitted to the host board 110. In particular, the second portion of signals may be transmitted to any other position within the device 100, and in this example, may be transmitted via one or more groups of cables 112, 114 to one or more external connection assemblies 116, 118. The external connection assemblies 116, 118 provide electronic connections to further devices or systems. Generally, the term "external connections" refer to a connection location for the cables 112, 114 that is different than the host board 110. As examples, the external connection assemblies 116, 118 may be backplane devices, motherboards, network connections, or server connections. Generally, the first set of signals transmitted to the host board 110 are relatively low speed signals, and the second set of signals transmitted to the external connection assemblies 116, 118 are relatively high speed signals. Although not shown, the electronic device 100 may further include any suitable devices and elements associated with computer or communications equipment, including power elements, cooling elements, memory components, additional input and output interfaces, interconnections, and the like.

Figure 4:
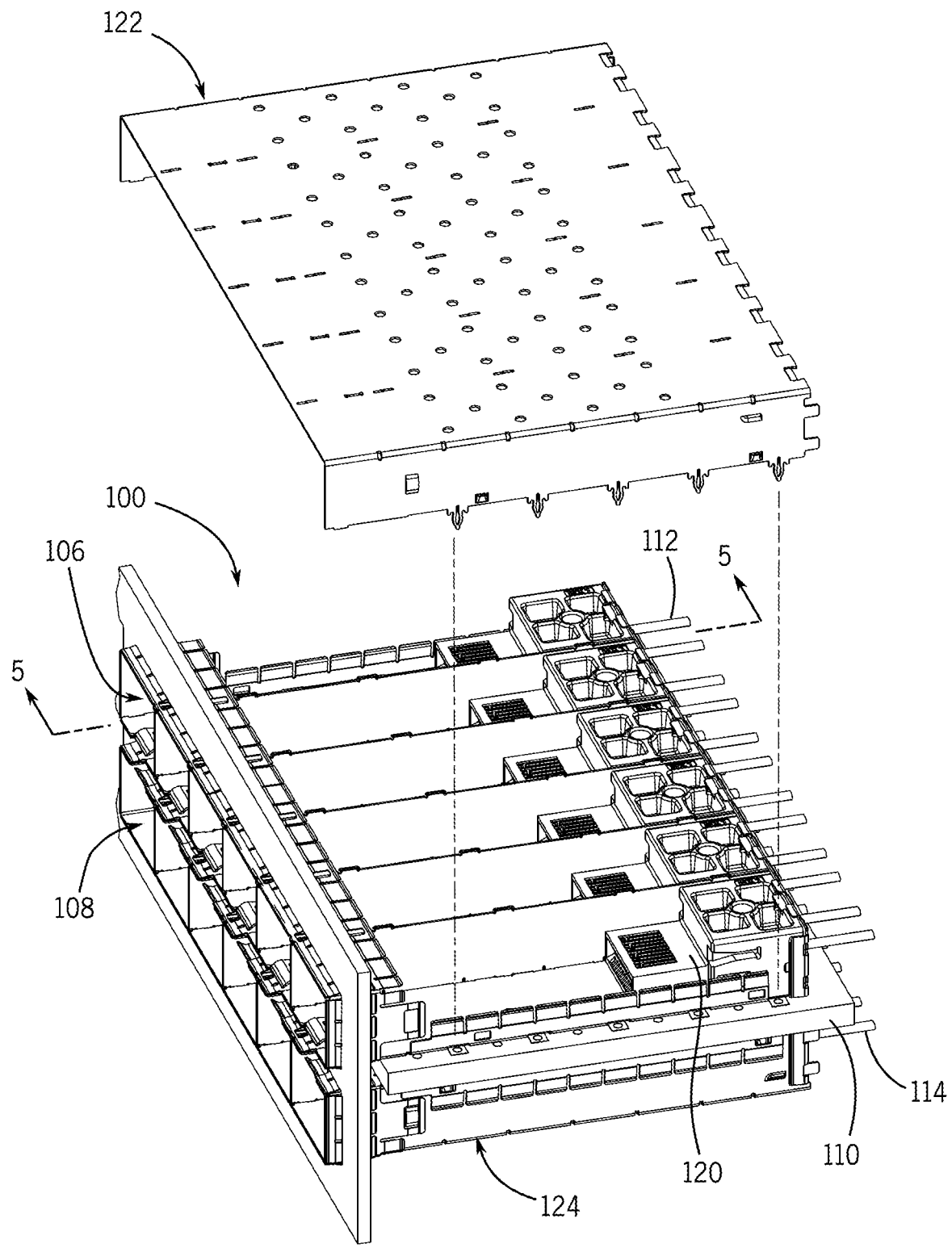
FIG. 4 is a partially exploded view of a portion of the electronic device of FIG. 1 according to an example embodiment.

Reference is further made to FIG. 4, which is a partial isometric view of the electronic device 100 that is partially exploded to provide additional interior views. As shown, a bypass connector module 120 (or "first" bypass connector module) is arranged at the distal end of the each of the first plug receptacles 106, e.g., six bypass connector modules 120 in the six plug receptacles 106. As described in greater detail below, each bypass connector module 120 provides a "hybrid" or "bypass" connection function in which the low speed signals and power from a connected plug 104 in the respective first plug receptacle 106 are transmitted to the host board 110 and the high speed signals from the plug 104 are transferred to one or more of the cables 112 and then to the external connection assembly 116. Although not visible in FIG. 4, a connector module (or "second" connector module) is arranged at the distal end of each of the second plug receptacles 108 to perform similar functions, e.g., to provide a hybrid or bypass connection function in which the low speed signals and power from a connected plugs 104 in the respective second plug receptacle 108 are transmitted to the host board 110 and the high speed signals from the plug 104 is transferred to one or more of the cables 114 and then to the external connection assembly 118.

A first shield assembly 122 (a portion of which has been exploded in FIG. 4) functions to shield the bypass connector modules 120 from electromagnetic interference. Similarly, a second shield assembly 124 functions to shield the second connector modules (not visible in FIG. 4). The first plug receptacles 106, the first bypass connector modules 120, and the first shield assembly 122 (collectively, an "array of shielded bypass connector modules") are arranged on the first (or upper) side of the host board 110; and the second plug receptacles 108, connector modules (not visible in FIG. 4), and the second shield assembly 124 are arranged on the second (or lower) side of the host board 110. Any number of bypass connector modules 120, and moreover, any number of arrays of shielded bypass connector modules may be provided. For example, other embodiments may provide only one array of shielded bypass connector modules (e.g., the second shield assembly 124 and receptacles 108 may be omitted) or more than two such shielded arrays may be provided. Unless otherwise noted, the characteristics of the array of shielded bypass connector modules discussed herein are applicable to any such shielded bypass connector modules.

Figure 5:
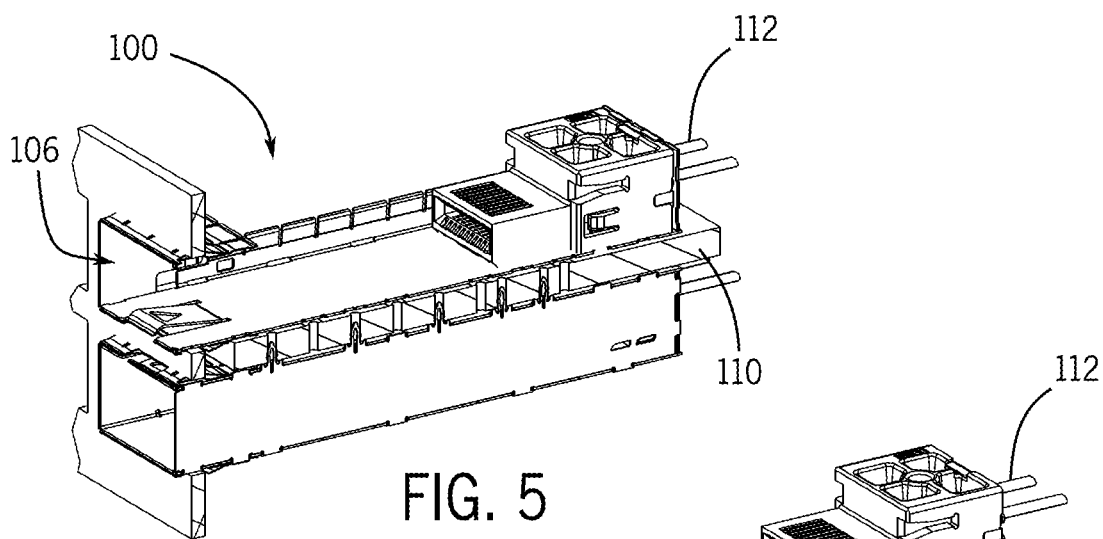
FIG. 5 is a cross-sectional view of the electronic device of FIG. 4 through line 5-5 according to an example embodiment.
Figure 6:
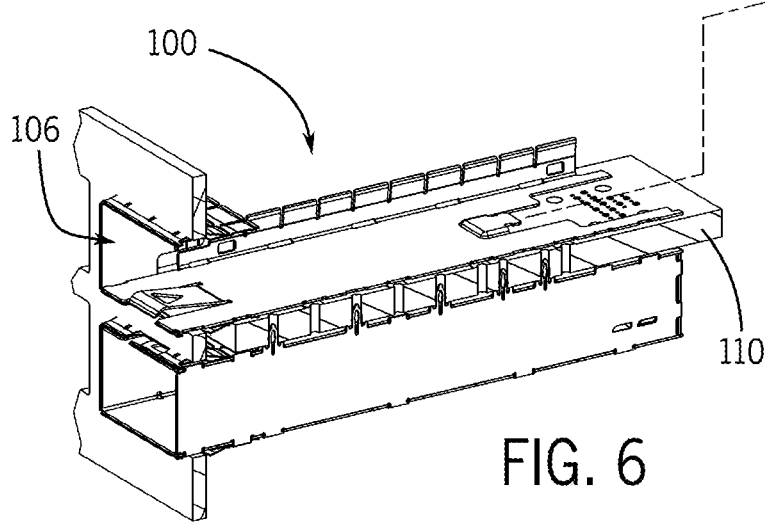
FIG. 6 is a partially exploded view of the electronic device of FIG. 5 according to an example embodiment.
Figure 7:
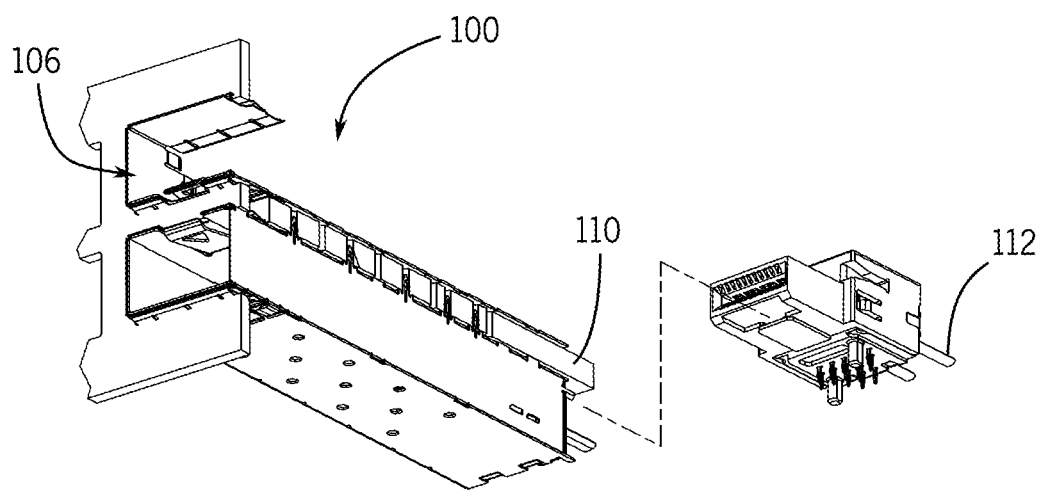
FIG. 7 is a further partially exploded view of the electronic device of FIG. 5 according to an example embodiment.

Reference is now made to FIGS. 5-7, which are various, partial cross-sectional and partially exploded isometric views of the electronic device 100. In particular, the view of FIG. 5 depicts the bypass connector module 120 at the distal end of the respective plug receptacle 106 with portions of the shield assembly 122 moved for clarity. As shown, the bypass connector module 120 is positioned to mate with a plug 104 (not shown in FIGS. 5-7) and further form electronic connections with the host board 110 underneath the bypass connector module 120 and with the cables 112 extending from the rear of the bypass connector module 120. As introduced in FIGS. 6 and 7 and discussed in greater detail below, during assembly, the bypass connector module 120 may be connected to the cables 112, inserted into and secured within the receptacle 106 at least partially formed by the shield assembly 122, and subsequently connected to the host board 110, although the assembly steps may vary.

Briefly, reference is made to FIG. 8, which is an isolated end view of one of the cables 112 that, as noted above, is generally used to carry high speed data. In one example, the cable 112 may be a "twin-ax" cable with two cable wires 130a, 130b that are sheathed in a dielectric covering, and in some examples, surrounded by one or more shield wires 132a, 132b. Additional details regarding the cables 112 and connection to one or more of the terminal sets 210, 230 are provided below.

The bypass connector module 120 will now be described in greater detail with reference to FIGS. 9-32. Initial reference is made to FIGS. 9-14, which are various isolated isometric view of the bypass connector module 120 in accordance with an example embodiment. The views of FIGS. 9 and 11 may be considered top side isometric views of the bypass connector module 120, although the connector module 120 has a portion (i.e., individual rear shield 280) of the shield assembly 122 removed for clarity; and FIG. 10 may be considered a bottom side isometric view. The views of FIGS. 11-13 are various exploded views of the bypass connector module 120.

Figure 14:
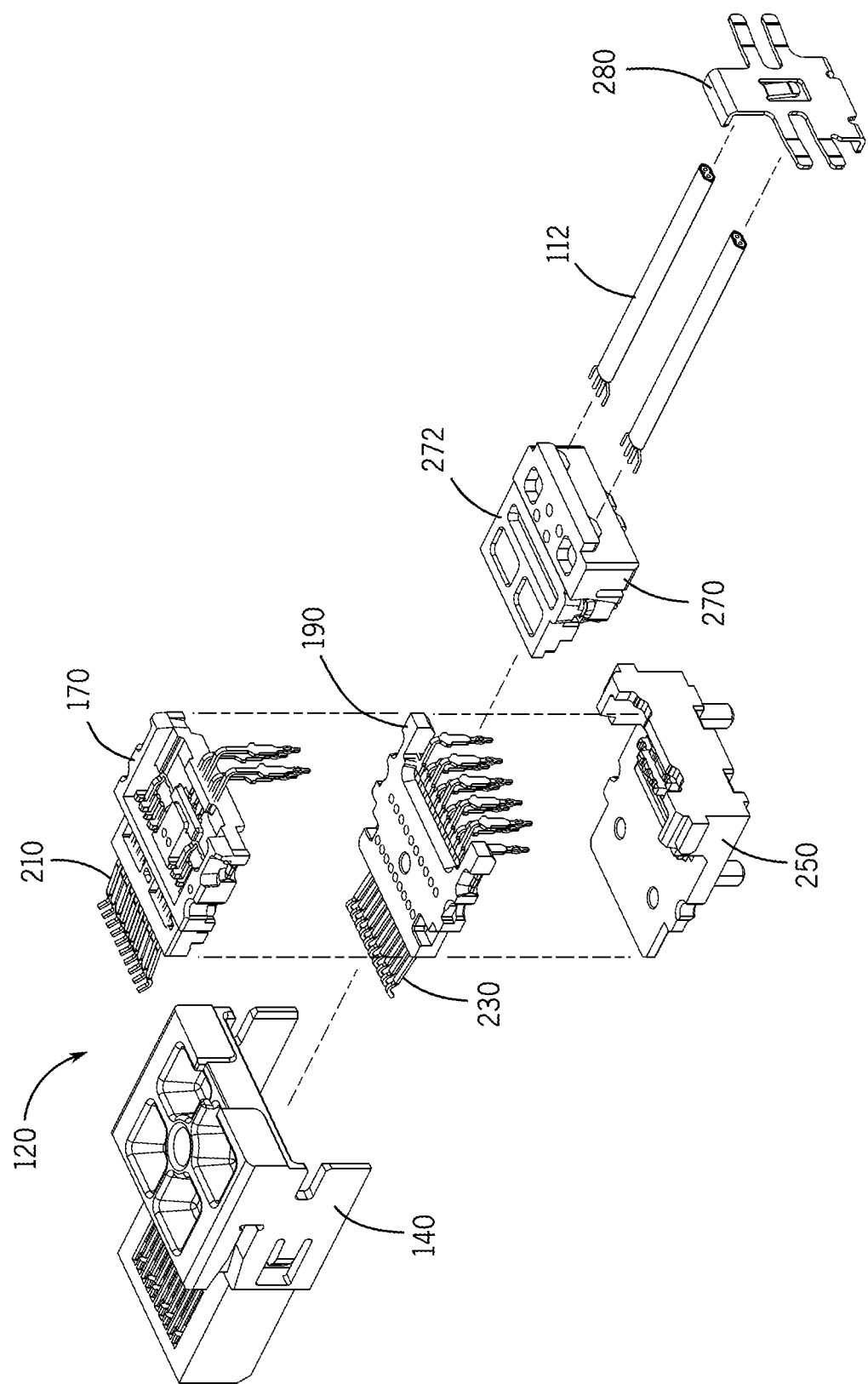
FIG. 14 is a further exploded view of the bypass connector module of FIGS. 9-11 according to an example embodiment.

As best shown in FIG. 14, the bypass connector module 120 may be generally considered to include a module housing 140, a first (or upper) wafer 170, a second (or lower) wafer 190, a first (or upper) wafer terminal set 210, a second (or lower) wafer terminal set 230, a tail alignment structure 250, and one or more overmold structures 270, 272. Each bypass connector module 120 may also be considered to include or otherwise be associated with an individual rear shield 280 that may be considered part of the shield assembly 122.

As shown, generally, the module housing 140 at least partially houses the wafers 170, 190, the terminal sets 210, 230, the tail alignment structure 250, and the overmold structures 270, 272; facilitates securement and proper placement within the respective receptacle 106 (see, e.g., FIGS. 5-7) and on the host board 110; and cooperates with the shield assembly 122 to ensure that the signals transmitted through the bypass connector module 120 are properly protected from interference. The module housing 140, wafers 170, 190, and tail alignment structure 250 may be formed from any suitable materials, including thermoplastic resins such as liquid crystal polymers (LCPs). The overmold structures 270, 272 may also be formed from any suitable materials, including thermoplastics such as polypropylene (PP).

Additional information regarding the module housing 140 is provided with reference to FIG. 15, which is a more detailed view of one side of the module housing 140, and FIGS. 16 and 17, which are isolated isometric views of the module housing 140.

In one example, the module housing 140 may be considered to include a body 142 that forms a first (or forward or front) body portion 144 oriented towards the front of the electronic device 100 and a second (or distal or rear) body portion 146 oriented towards the interior of the electronic device 100. The forward body portion 144 generally functions to house the portions of the terminal sets 210, 230 to facilitate connections with the plug 104, and the distal body portion 146 generally functions to house the portions of the wafers 170, 190, the terminal sets 210, 230, and tail alignment structure 250 that facilitate connections between the terminal sets 210, 230 and the host board 110 or between the terminal sets 210, 230 and the cables 112, 114.

As shown, the forward body portion 144 of module housing body 142 may be considered to have one or more walls (or faces) 148a-148d, including a top wall 148a, a bottom wall 148b, and lateral side walls 148c, 148d. The forward body portion 144 forms an interior forward end cavity 150 with an array of terminal channels that support the terminal sets 210, 230 such that individual terminals 212 may contact corresponding individual terminals of a plug 104 inserted into receptacle 106 (e.g., FIG. 2). The forward body portion 144 also supports an underside mating feature 152 on the bottom wall 148b that enables placement and securement within the receptacle 106, as discussed in greater detail below.

The distal body portion 146 of the module housing body 142 may be considered to include to have one or more walls (or faces) 154a-154e, including a top wall 154a, a bottom wall 154b, lateral side walls 154c, 154d, and a rear wall 154e. The side walls 154c, 156d support a number of mating or alignment features 156a, 156b, 158a, 158b, 160a, 160b that facilitate alignment, positioning, and/or securement of the bypass connector module 120 and/or the components therein. In particular, the mating features 156a, 156b, 158a, 158b, 160a, 160b include a forward slot 156a, 156b in each of the side walls 154c, 154d that facilitates placement of the bypass connector module 120 within the receptacle 106; a rear slot 158a, 158b in each of the side walls 154c, 154d that facilitates alignment and placement of the tail alignment structure 250 within module housing 140; and a latch 160a, 160b that facilitates placement and securement of the wafers 170, 190 within the module housing 140. The rear wall 154e of the distal body portion 146 also includes a mating feature 162 that receives a portion of the individual rear shield 280, as discussed in greater detail below.

The upper wafer 170 and upper wafer terminal set 210 are discussed in greater detail with reference to FIGS. 18-20, which are isolated views of the upper wafer 170 and upper wafer terminal set 210. The cables 112 are included in FIG. 18 and have been removed in FIG. 19 and for clarity.

The upper wafer 170 may be considered to include a body 172 that generally defines a front (or first longitudinal) end (or face) 174a, a rear (or second longitudinal) end (or face) 174b, first and second lateral sides 174c, 174d, a top (or first normal) face 174e, and a bottom (or second normal) face 174f. They body 172 may also be considered to form a partially closed section 176 that partially encloses the terminal set 210 and a partially open section 178 in which at least a portion of the top face 174e is open to accommodate connections between at least portions of the terminal set 210 and the cables 112. Additionally, a number of terminal supports 180 are positioned within the partially open section 178 to support the terminal set 210, particularly in the lateral directions.

The upper wafer 170 additionally includes a number of mating or alignment features 182a-182h that facilitate assembly and alignment within the bypass connector module 120. In particular, the mating features 182a-182f include a central peg 182a extending from the bottom face 174f that is inserted into the lower wafer 190 to ensure proper placement of the wafers 170, 190; alignment pegs 182b, 182c extending from the bottom face 174f in positions proximate to each of the lateral sides 174c, 174d that also function to ensure proper placement of the upper wafer 170 relative to the lower wafer 190; a pair of placement indentions 182d, 182e, 182f, 182g on each of the lateral sides 174c, 174d that also function to ensure proper placement of the upper wafer 170 relative to the lower wafer 190; and one or more ridges 182h that extend from the bottom face 174f with a lateral orientation that function to ensure proper spacing of the upper wafer 170 relative to the lower wafer 190. As shown, the rear face 174b of the upper wafer 170 may be shaped to accommodate placement of the cables 112.

The upper wafer terminal set 210 may have any suitable configuration and composition. In the depicted example, the terminal sets 210 is made up of ten (10) terminals 212a-212j (generally, terminals 212). As one example, the terminals 212a-212j may include a number of ground terminals 212a, 212d, 212g, 212j; a number of low speed or power terminals 212e, 212f, and a number of high speed terminals 212b, 212c, 212h, 212i. As shown, and as discussed in greater detail below, terminals 212d, 212g, 212e, 212f are configured to mate with the host board 110, and terminals 212b, 212c, 212h, 212i are coupled to the cables 112. Briefly, and as depicted in an example reference of FIG. 19, the terminals (e.g., terminals 212d, 212g, 212e, 212f) that mate with the host board 110 may have a shape that facilitates a respective press or EON fit with the host board 110 underneath the bypass connector module 120. In particular, each of the terminals 212d, 212g, 212e, 212f may have a forward end portion 214 that extends from the forward end 174 of the upper wafer 170 into the cavity 150 of the module housing 140 to mate with a corresponding terminal of the plug 104 (FIG. 2), and a terminal "tail" (or terminal distal end portion) 216 that angularly extends at a bend 218 of approximately 90° relative to the terminal forward end portion 214. Generally, each forward end portion 214 extends from the forward end that forms a connection with the plug 104 (FIG. 2), through the partially closed section 176, and into the partially open section 178; and at the bend 218, a group of the terminals (e.g., terminals 212d, 212g, 212e, 212f) transition to the tails 216. The tails 216 extends downward through the tail alignment structure 250 to mate with the host board 110, as described in greater detail below. As also discussed in greater detail below, the tails 216 may form a shoulder 220, a narrowed section 222, and a terminal pin 224 that facilitate guidance through the tail alignment structure 250 and placement and mating with the host board 110.

Figure 18:
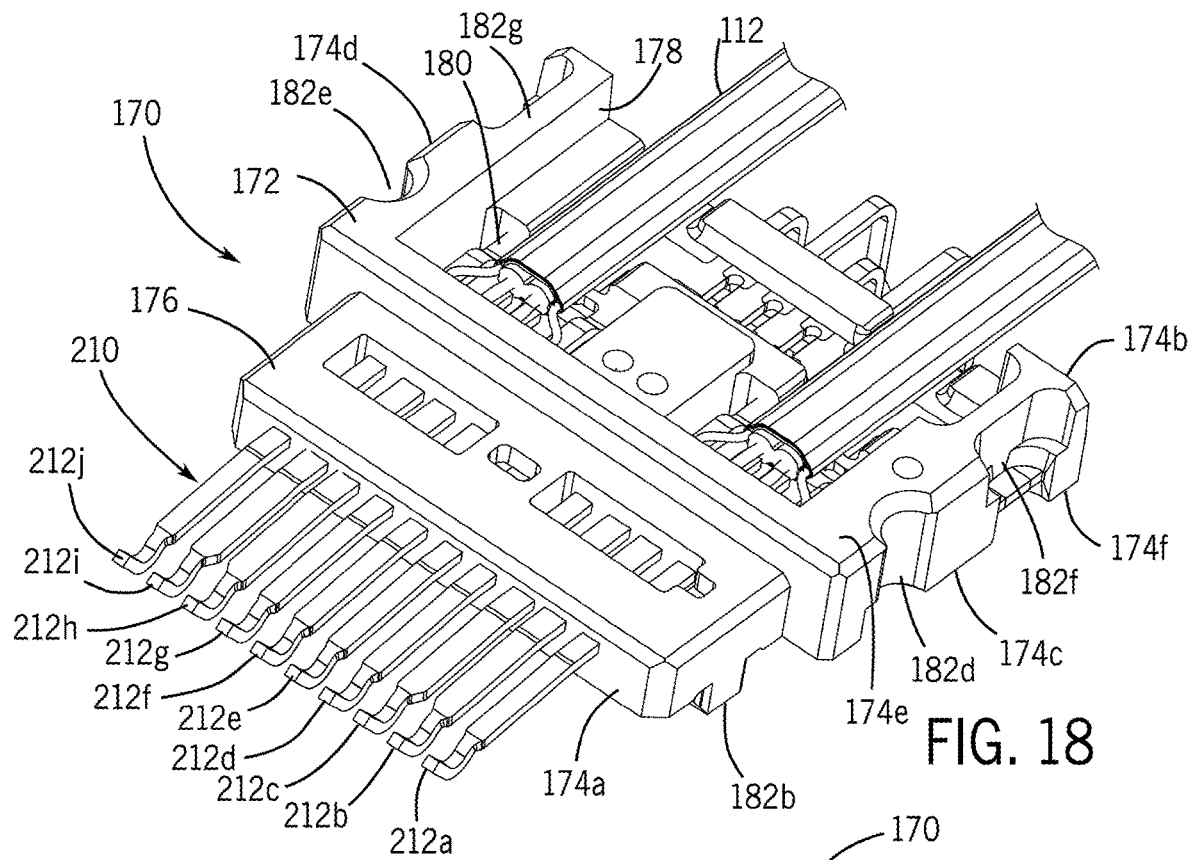
FIG. 18 is an isometric view of an upper wafer of the bypass connector module of FIGS. 9-15 according to an example embodiment.
Figure 19:
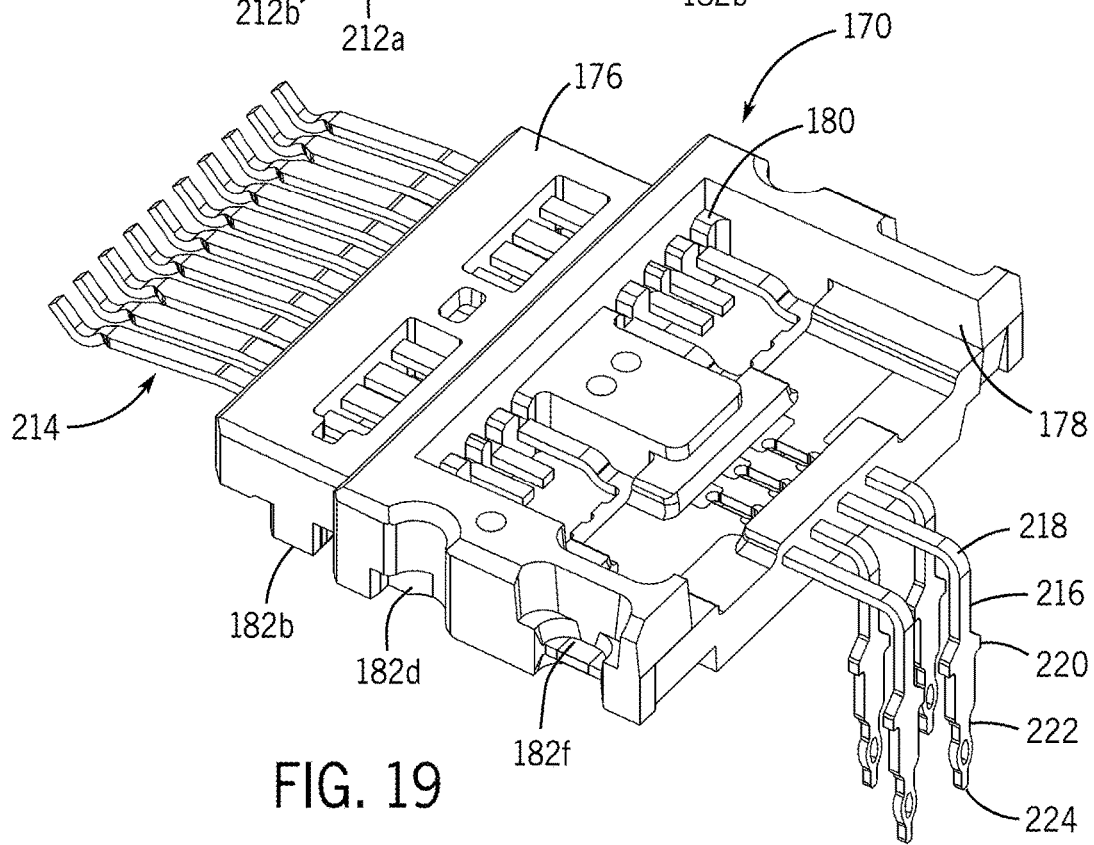
FIG. 19 is a further isometric view of the upper wafer of the bypass connector module of FIGS. 9-15 according to an example embodiment.
Figure 20:
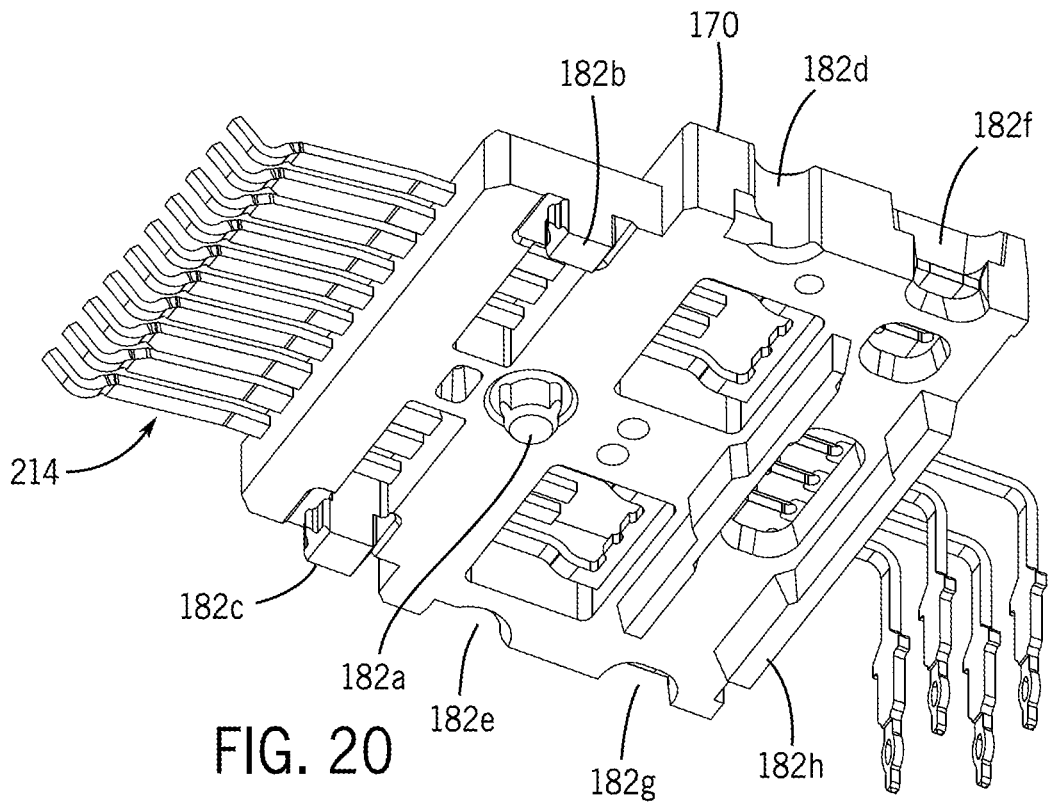
FIG. 20 is a further isometric view of the upper wafer of the bypass connector module of FIGS. 9-15 according to an example embodiment.

In this example, and as shown by a comparison of FIGS. 18 and 19, the cables 112 may be connected to the appropriate terminals 212, which in this case are the high speed terminals 212b, 212c, 212h, 212i. Such connection may be provided within the partially open section 176 of the upper wafer 170 such that the partially open section 176 may function as a termination tray for the cables 112. In particular, and referring additionally to FIG. 8, high speed terminals 212b, 212c may be connected to high speed wires 130a, 130b of one of the cables 112, and high speed terminals 212h, 212i may be connected to high speed wires 130a, 130b of the other cable 112. Additionally, the grounding wires 132a, 132b may be connected to the respective pairs of ground terminals 212a, 212d, 212g, 2126i j.

The lower wafer 190 and lower wafer terminal set 230 are discussed in greater detail with reference to FIGS. 21 and 22, which are isolated views of the lower wafer 190 and bottom wafer terminal arrangement 230. In this example, it is noted that the lower wafer terminal set 230 is configured to transmit low speed signals and power to the host board 110 such that no high speed cables (e.g., similar to cables 112) are coupled to the lower wafer terminal set 230.

The lower wafer 190 may be considered to include a body 192 that generally defines a front (or first longitudinal) end (or face) 194a, a rear (or second longitudinal) end (or face) 194b, first and second lateral sides 194c, 194d, a top (or first normal) face 194e, and a bottom (or second normal) face 194f. They body 192 may also be considered to form a partially closed section 196 that partially encloses the terminal set 230 and a partially open section 198 in which the terminal set 230 is supported and bent to transition into connection with the host board 110, as discussed in greater detail below. A number of terminal supports 200 are positioned within the partially open section 198 to support the terminal set 230.

The lower wafer 190 additionally includes a number of mating or alignment features 202a-202i that facilitate assembly and alignment within the bypass connector module 120. In particular, the mating features 202a-202i include a central peg hole 202a formed in the top face 194e that receives the central peg 182a of the upper wafer 170 during assembly; top surface lateral indentions 202b, 202c within the top face 194e at each of the lateral sides 194c, 194d to receive the lateral pegs 182b, 182c; a pair of placement indentions 202d, 202e, 202f, 202g on each of the lateral sides 194c, 194d that also function to ensure proper placement of the upper wafer 170 relative to the lower wafer 190; and a pair of underside pegs 202h, 202i extending from the bottom face 194f that mate with the tail alignment structure 250, as discussed below.

Similar to the upper wafer terminal set 210, the lower wafer terminal set 230 may have any suitable configuration and composition. In the depicted example, the terminal set 230 is made up of ten (10) terminals (or pins) 232a-232j (generally, terminals 232). Again, any suitable number and combination of terminals 232a-232j may be provided. In this example, all of the terminals 232a-232j of the second wafer terminal set 230 are low speed or power terminals that mate with the host board 110.

Figure 21:
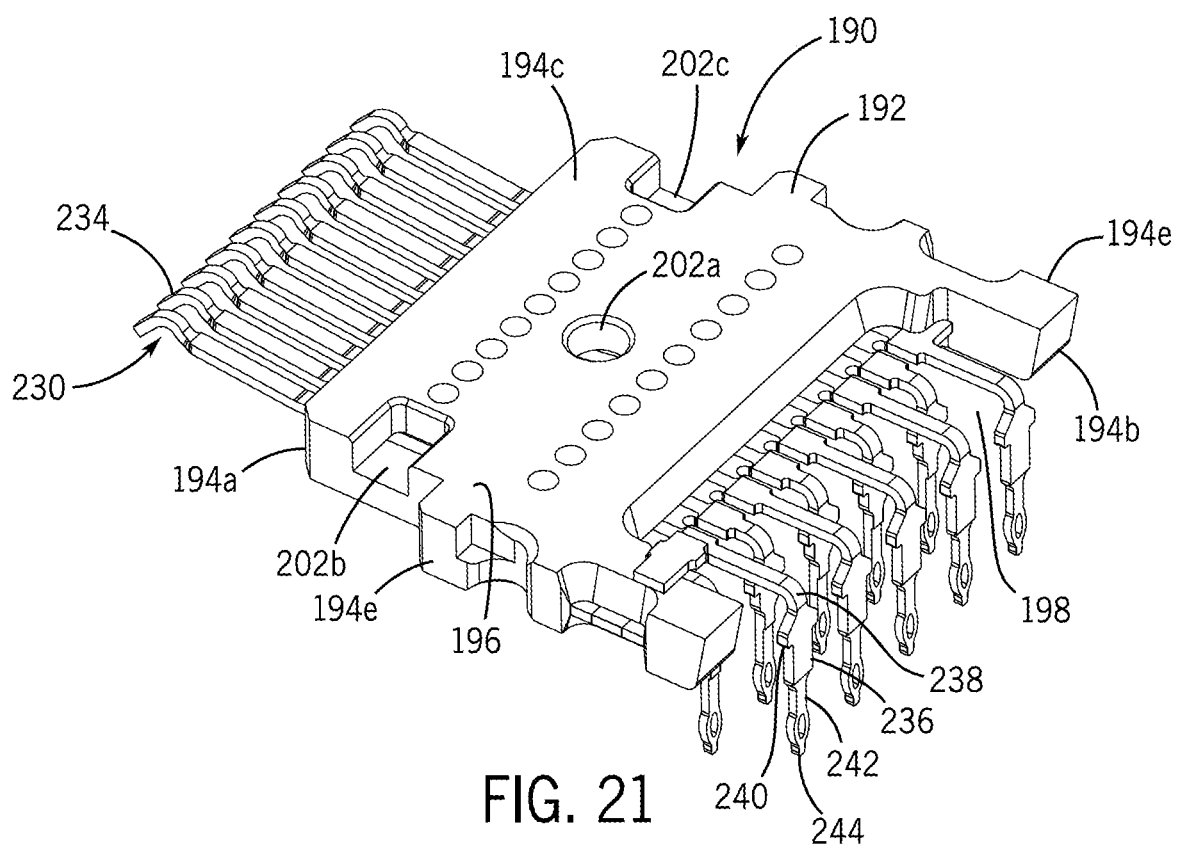
FIG. 21 is an isometric view of a lower wafer of the bypass connector module of FIGS. 9-15 according to an example embodiment.
Figure 22:
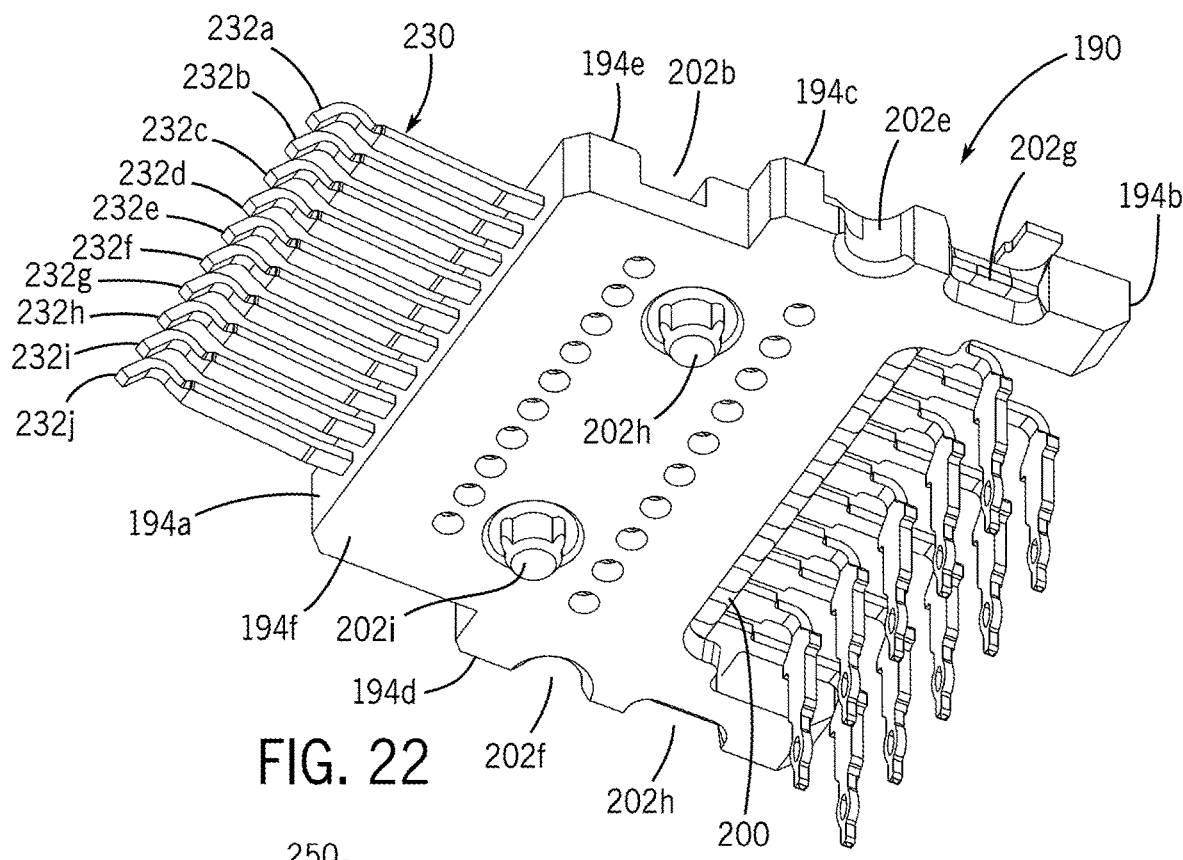
FIG. 22 is a further isometric view of the lower wafer of the bypass connector module of FIGS. 9-15 according to an example embodiment.
Figure 23:
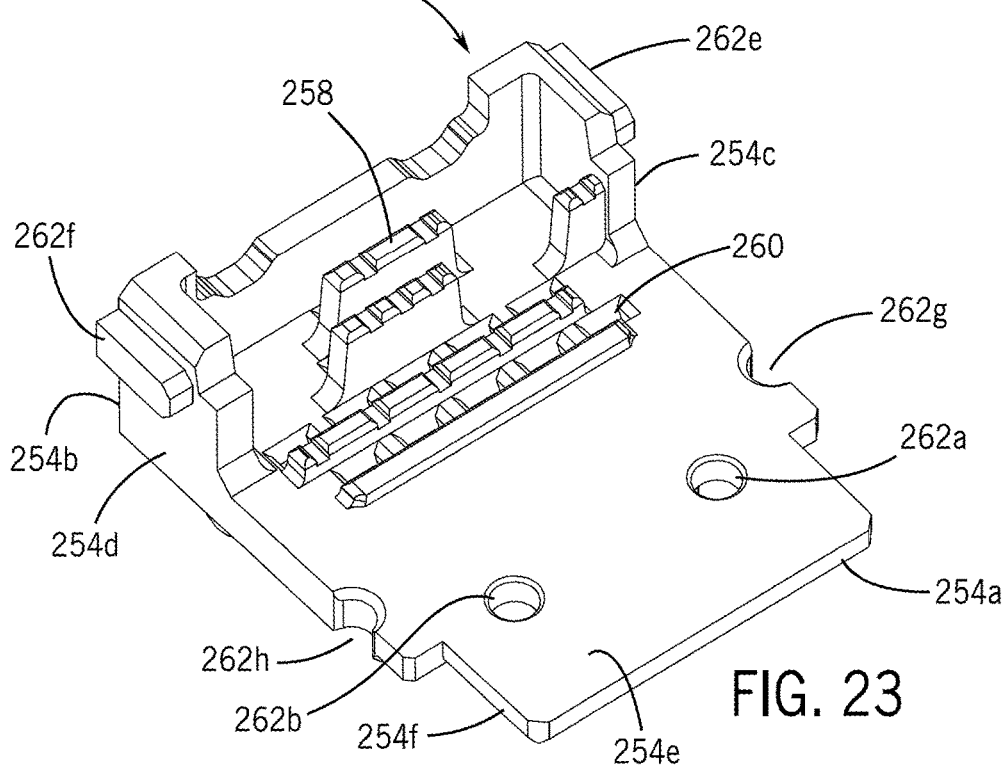
FIG. 23 is an isometric view of a tail alignment structure of the bypass connector module of FIGS. 9-15 according to FIG. 24 is a partially exploded view of a portion of the bypass connector module of FIGS. 9-15 according to an example embodiment.

Briefly, and as depicted in an example reference of FIG. 21, the terminals 232a-232j may have a shape that facilitates a respective press fit with the host board 110 underneath the bypass connector module 120. In particular, each of the terminals 232a-232j may have a forward end portion 234 that extends from the forward end 194 of the lower wafer 190 into the cavity 150 of the module housing 140 to mate with a corresponding terminal of the plug 104 (FIG. 2), and a tail (or terminal distal end portion) 236 that angularly extends at a bend 238 of approximately 90° relative to the terminal forward end portion 234. Generally, the forward end portion 234 extends from the forward end that forms a connection with the plug 104 (FIG. 2), through the partially closed section 196, and the partially open section 198; and at the bend 218, the terminal (e.g., terminals 232a-232j) transitions to the tail 236. The tails 236 extend downward through the tail alignment structure 250 to mate with the host board 110, as described in greater detail below. As also discussed in greater detail below, the terminal tail 236 may form a shoulder 240, a narrowed section 242, and a terminal pin 244 that facilitate guidance through the tail alignment structure 250 and placement and mating with the host board 110.

Figure 24:
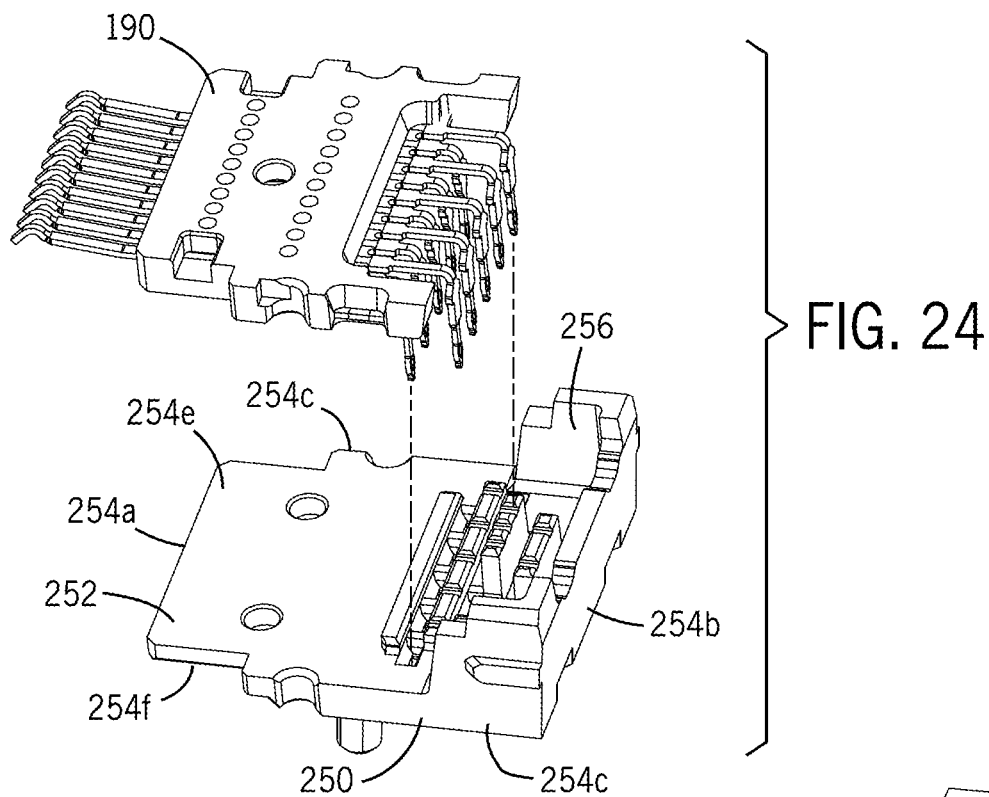
Figure 25:
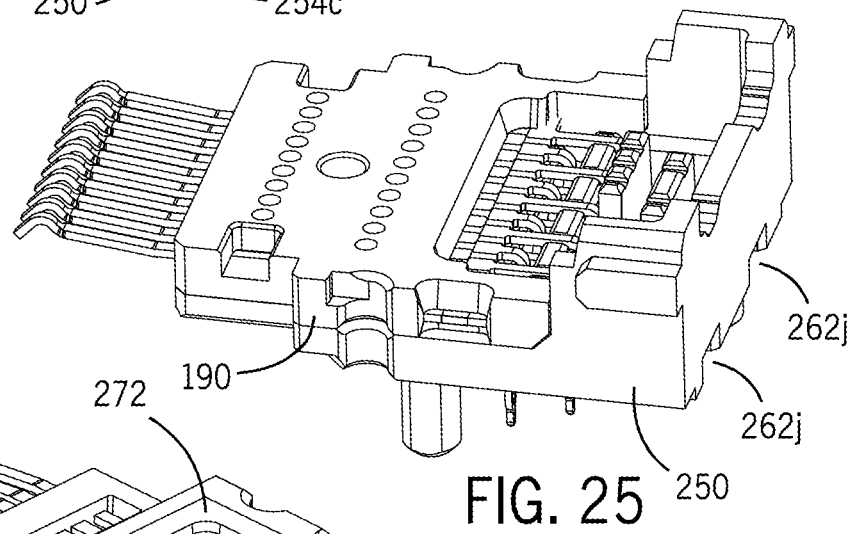
FIG. 25 is a partial, isometric view of the bypass connector module of FIGS. 9-15 with portions removed for clarity according to an example embodiment.
Figure 26:
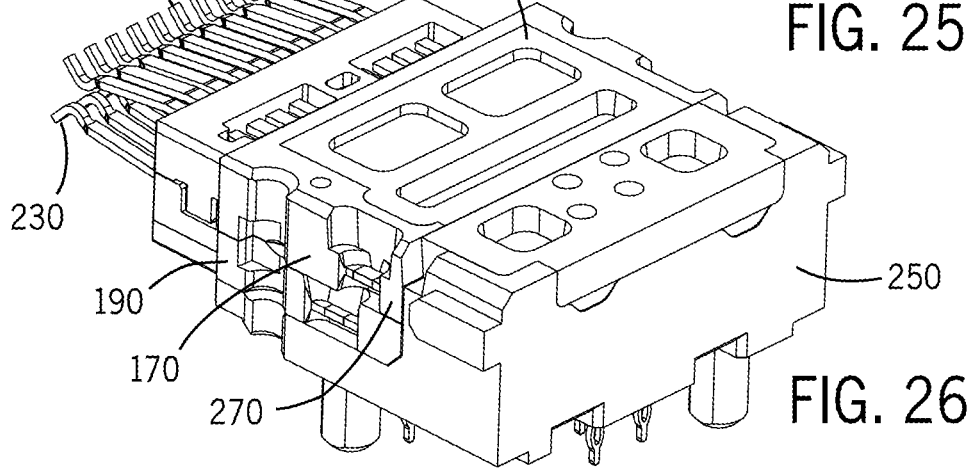
FIG. 26 is a further isometric view of at least portions of the bypass connector module of FIGS. 9-15 according to an example embodiment.

Reference is now made to FIGS. 23-27 for a more detailed discussion of the tail alignment structure 250. Such views include FIG. 23, which is an isolated top side isometric view of the tail alignment structure 250; FIGS. 24 and 25, which are respective partially exploded and joined isometric views of the tail alignment structure 250 with the lower wafer 190; FIG. 26, which is a rear top isometric view of the tail alignment structure 250 supporting the wafers 170, 190, terminal sets 210, 230, and overmold structures 270, 272; and FIG. 27, which is a bottom front isometric view of the tail alignment structure 250 supporting the wafers 170, 190, terminal sets 210, 230, and overmold structures 270, 272.

The tail alignment structure 250 is formed by a body 252 with a front (or first) longitudinal end 254a; a rear (or second) longitudinal end 254b; first and second lateral side walls 254c, 254d; an upper (or first normal) face 254e, and a lower (or second normal) face 254f. The portion of the upper face 254e proximate to the front end 254a is generally flat to form a generally flush engagement with the lower wafer 190. The lateral side walls 254c, 254d are more pronounced towards the rear longitudinal end 254b, and with a wall extending from the upper face 254e at the rear end 254b, form a cavity 256 that at least partially encloses the tails 216, 236 of the terminal sets 210, 230. A number of tail supports 258 are formed within the cavity 256 on the upper face 254e to support the positioning of the terminals 212, 232, and tail slots 260 are formed through the upper and lower faces 254e, 254f to enable the terminals 212, 232 to extend through the tail alignment structure 250 and mate with the host board 110. Further, the tail alignment structure 250 may include a number mating or alignment features 262a-j, which include one or more peg slots 262a, 262b generally proximate to the front longitudinal end 254a and positioned to receive the corresponding pegs 202h, 202i of the lower wafer 190; one or more underside pegs 262c, 262d extending from the lower normal face 254f that facilitate positioning and securement of the tail alignment structure 250 (and the bypass connector module 120) to the host board 110; a pair of side protrusion 262e, 262f extending laterally from the side walls 254c, 254d to facilitate assembly of the tail alignment structure 250 (and the bypass connector module 120) within the receptacle 106; a pair of side indentions 262g, 262h within the side walls 254c, 254d to facilitate alignment with the wafers 170, 190; and a pair of rear notches 262i, 262j at the corner of the intersection between the rear end 254b and lower face 254f.

As noted above, the tail alignment structure 250 operates to maintain the positions of the terminals 212, 232 during assembly of the connector module 120 and upon engagement of the tails 216, 236 with the host board 110 (i.e., to maintain a true position). Such alignment maintenance is provided, even though the terminals 212, 232 that extend through the tail alignment structure 250 are staggered and bent by 90°, which enable a belly to belly engagement with the host board 110. In particular, the alignment, mating, and support features of the wafers 170, 190, housing 140, and tail alignment structure 250, along with the overmold structures 270, 272, provide strength and stability to maintain the positions of the tails 216, 236 as an EON connection.

The bypass connector module 120 may be formed and assembled in any suitable manner, examples of which are depicted in FIGS. 28-30, which are various views of portions of a bypass connector module 120 with partially exploded components.

In one example, the terminal sets 210, 230 are integrated with the wafers 170, 190, e.g., the wafers 170, 190 are molded over terminal wires and appropriately refined; and the terminals 212, 232 are cut and formed into the appropriate size and shape. The cables 112 may be connected to the appropriate terminals 212, 232 at the point at which the wafers 170, 190 are integrated with the terminal sets 210, 230 or upon assembly of the wafers 170, 190 with one another and the tail alignment structure 250, discussed below.

As can be discerned from these views, the lower wafer 190 may be received within the tail alignment structure 250 such that the tails 236 of the lower wafer 190 extend through the tail alignment structure 250. The side indentions 202d, 202e of the lower wafer 190 and the side indentions 262g, 262h may be aligned to ensure proper placement of the lower wafer 190 within the tail alignment structure 250. Moreover, the underside pegs 202h, 202i of the lower wafer 190 may be received in the peg slots 262a, 262b to further ensure proper placement of the lower wafer 190 within the tail alignment structure 250.

The upper wafer 170 may be placed on top of the lower wafer 190. The various mating features 182a-182g of the upper wafer 170 cooperate with mating features 202a-202g to ensure proper alignment and placement of the wafers 170, 190 relative to one another and other components of the bypass connector module 120. In this example, the central peg 182a of the upper wafer 170 is received by the central peg hole 202a of lower wafer 190; the lateral pegs 182b, 182c are received in the lateral peg slots 202b, 202c to facilitate alignment of the wafers 170, 190. Moreover, the side indentions 182d, 182e, 182f, 182g may be aligned with the side indentions 202d, 202e, 202f, 202g in order to ensure proper placement of the upper wafer 170 on the lower wafer 190.

Any number of appropriate overmold structures 270, 272 may be formed to stabilize and secure the various components of the bypass connector module 120. The first overmold structure 270 may be formed within the partially open section 198 of the lower wafer 190 and within the tail cavity 256 of the tail alignment structure 250. The second overmold structure 272 may be formed within the partially open section 178 of the upper wafer 170. Typically, the overmold structures 270, 272 are formed during assembly of the connector module 120 in which an overmold material is poured over the wafers 170, 190 and terminal sets 210, 230 to set the various connections and provide physical strength and stability. Prior to application of the overmold structures 270, 272, glue may be applied to tail slots 260 of the tail alignment structure 250 in order to prevent the possible leakage of the overmold materials.

The resulting combination of wafers 170, 190, terminal sets 210, 230, tail alignment structure 250, and overmold structures 270, 272 form a generally unitary structure that may be inserted into the module housing 140. In particular, the forward end portions 214, 234 of the terminal sets 210, 230 are positioned in the pin channels of the forward end cavity 150 of the module housing 140. In this position, and as best shown in FIG. 15, the latches 160a, 160b in the side walls 154c, 154d of the module housing 140 engage with the corresponding indentions 182f, 182g of the upper wafer 170, thereby securing the longitudinal position of the upper wafer 170 (and attached components) within the module housing 140. As also best shown in FIG. 15, the side protrusions 262e, 262f of the tail alignment structure 250 are positioned within the rear slots 158a, 158b of the module housing 140.

Figure 31:
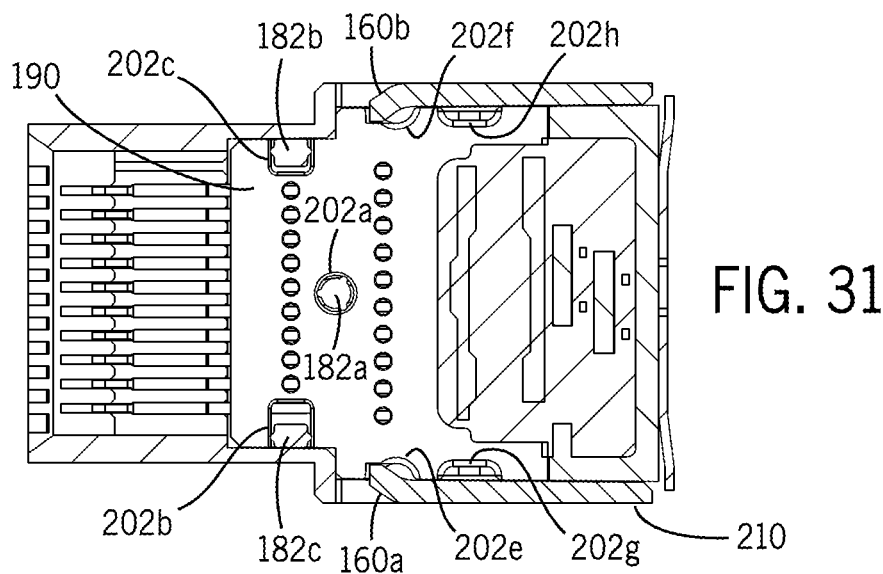
FIG. 31 is a cross-sectional view of the bypass connector module of FIGS. 9-15 according to an example embodiment.
Figure 32:
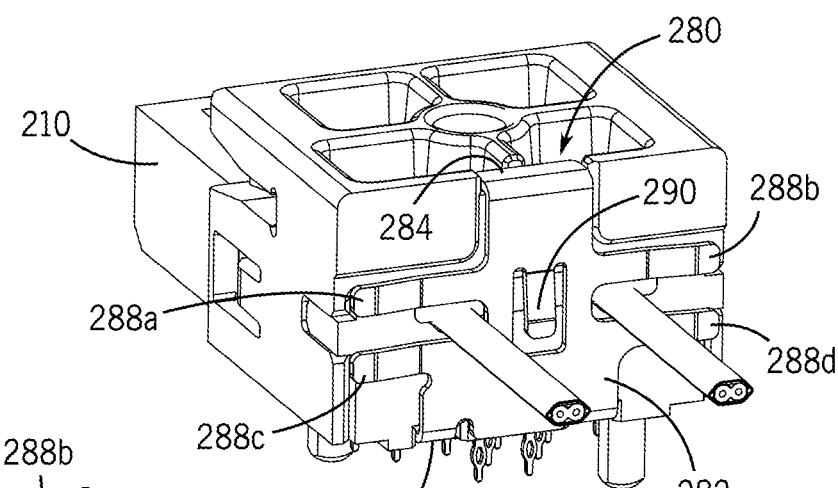
FIG. 32 is a further isometric view of the bypass connector module of FIGS. 9-15 according to an example embodiment.

Additional details about the relationships between the various components of the bypass connector module 120 are depicted in the cross-sectional views of FIG. 31. As shown in FIG. 31, the latches 160a, 160b of the module housing 140 may engage the side indentions 202e, 202f of the lower wafer 190 (and/or the side indentions 182e, 182f of the upper wafer 170). This latching relationship is also depicted in FIG. 15.

Figure 33:
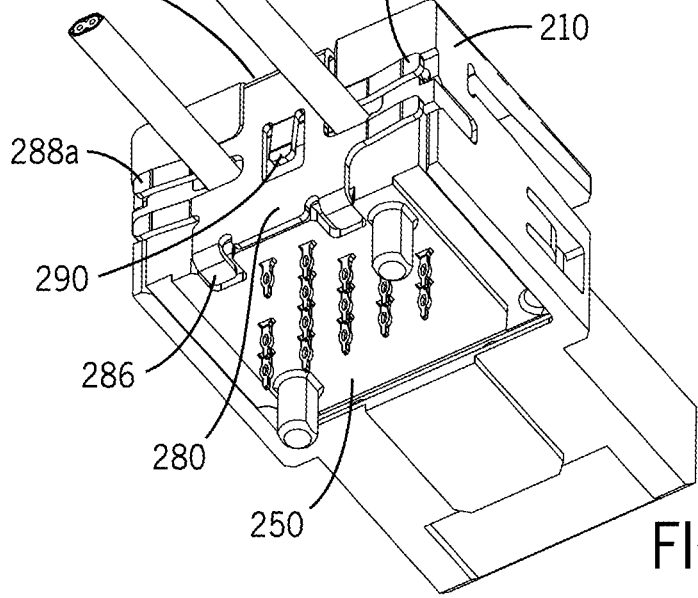
FIG. 33 is a further isometric view of the bypass connector module of FIGS. 9-15 according to an example embodiment.

As discussed above, and additionally referring to FIGS. 32 and 33, the individual module rear shield 280 is attached to the rear side of the bypass connector module 120. The rear shield 280 is formed by a body 282 with an upper leg 288 and a lower leg 286. As shown, the upper leg 284 is received within the rear notch 162 of the module housing 140 and the distal end of the upper leg 284 is bent over the top wall 154a of the module housing 140; and the lower leg 286 is received within the rear notches 262i, 262j at the corner of the intersection between the rear end 254b and lower face 254f of the tail alignment structure 250. The rear shield 280 further includes two pairs of lateral legs 288a, 288b, 288c, 288d that cooperate to accommodate passage of the cables 112. As shown, one of the cables 112 passes between legs 288a, 288b and the other cable 112 passes through legs 288c, 288d. Further, the module rear shield 280 additionally includes a central spring element 290 within the center that functions to provide spacing with other aspects of the shield assembly 122.

The shield assembly 122 will now be discussed in greater detail with reference to FIGS. 34-46. As noted, the shield assembly 122 may be considered the first shield assembly 122, and the characteristics discussed herein with respect to the first shield assembly 122 are also applicable to the second shield assembly 124.

Figure 37:
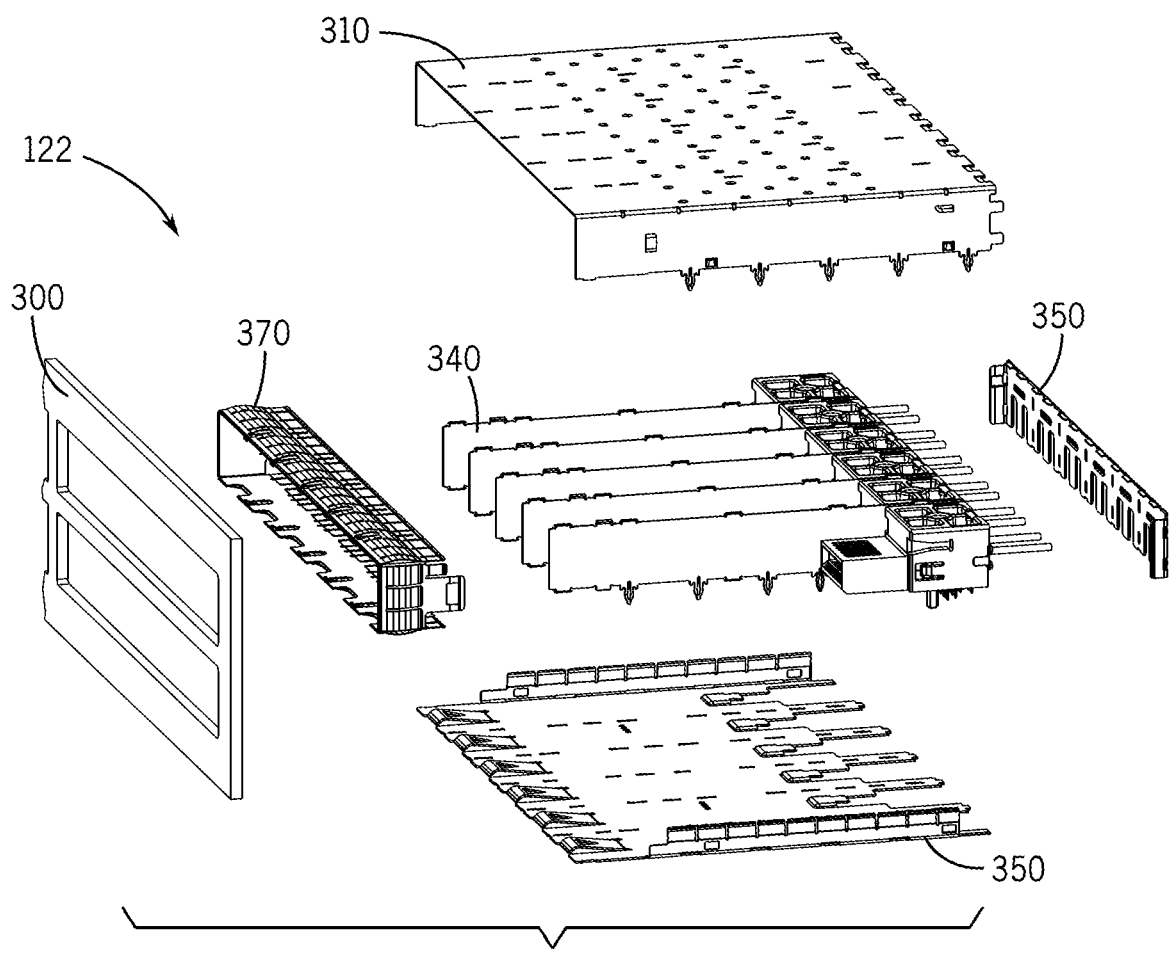
FIG. 37 is a further partially exploded view of at least portions of the shield assembly of the bypass connector module of FIGS. 9-15 according to an example embodiment.
Figure 38:
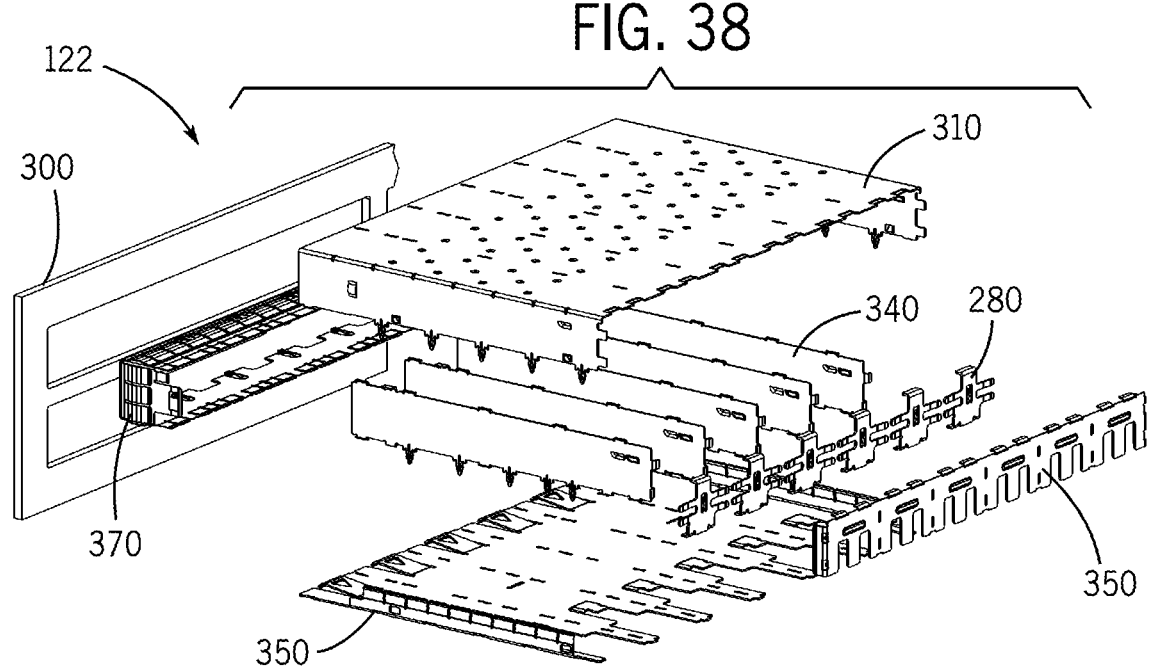
FIG. 38 is a further partially exploded view of at least portions of the shield assembly of the bypass connector module of FIGS. 9-15 according to an example embodiment.

The views of FIGS. 34-46 are partially exploded views of the shield assembly 122 with the other components of the electronic device 100, while FIG. 37 is an exploded view of the shield assembly 122 removed from the host board 110 that depicts the bypass connector modules 120 and FIG. 38 is an isolated exploded view of the shield assembly 122. In one example, the shield assembly 122 includes a front plate 300, an upper shield cover 310, a shield tray 320, a rear shield plate 350, a receptacle partitions 340, a forward receptacle frame 370, and the individual rear shields 280.

As an introduction and discussed in greater detail below, the bypass connector modules 120 with the individual rear shields 280 are supported on the shield tray 320 into receptacles 106 that may be defined by the receptacle partitions 340. The upper shield cover 310 may partially enclose the array of bypass connector modules 120 by mating with the shield tray 320. The forward receptacle frame 370 is secured to the front of the array of receptacles 106 and the rear shield plate 350 is secured to the opposite or distal end of the receptacles 106. Finally, the front plate 300 is secured to the front of the electronic device 100 with openings 302a, 302b to frame each array of the receptacles 106, 108.

Figure 39:
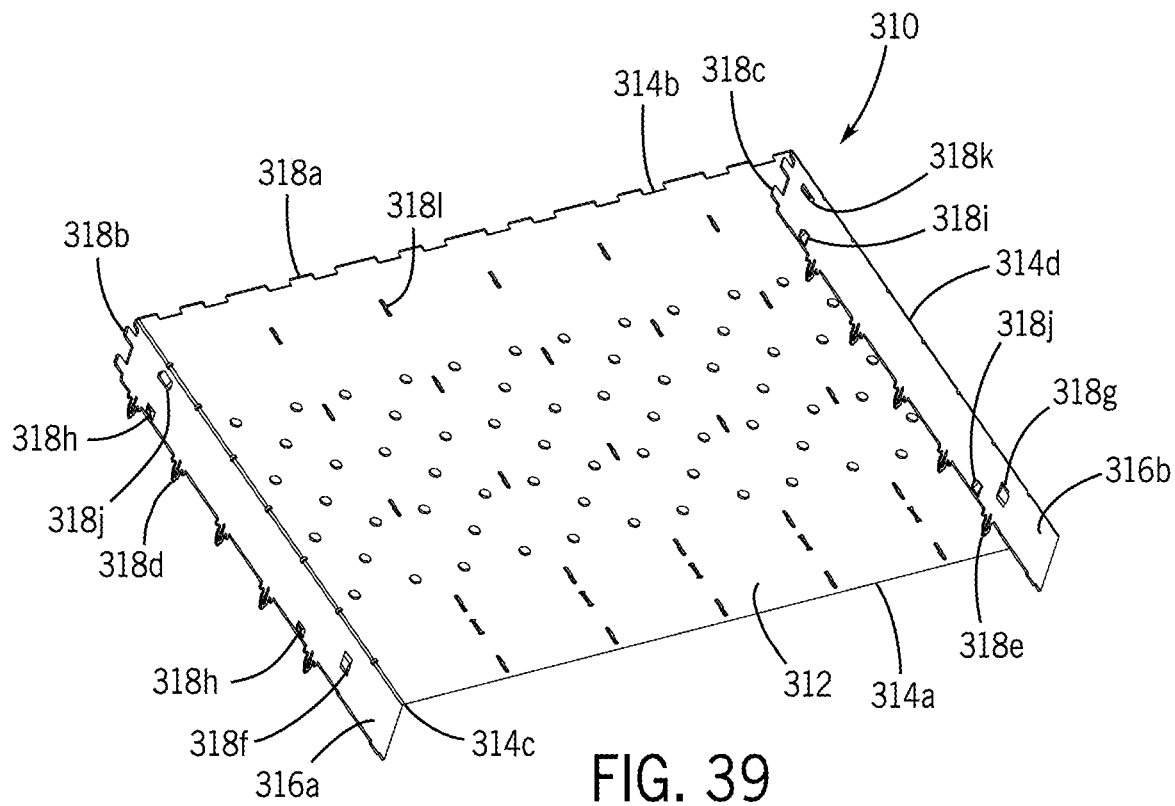
FIG. 39 is an isometric view of an upper shield cover of the shield assembly of FIGS. 34-38 according to an example embodiment.

Briefly, additional details about the upper shield cover 310 are discussed with reference to the isolated view of the upper shield cover 310 of FIG. 39. In this example, the upper shield cover 310 is formed by a relatively planar base plate 312 that may be considered to have a front edge 314a, a rear edge 314b, and side edges 314c, 314d. The upper shield cover 310 further includes side walls 316a, 316b that extend from the side edges 314c, 314d of the base plate 312. The upper shield cover 310 includes a number of mating features 318a-318l, including the following: an array of rear tabs and slots 318a extending across the rear edge 314b of the base plate 312 that are configured to engage with the rear shield plate 350; one or more rear tabs or slots 318b, 318c that extend from the rear edges of the side walls 316a, 316b that are also configured to engage with the rear shield plate 350; an array of side wall mounting pegs 318d, 318e extending across the lower edge of the side walls 316a, 316b that are configured to engage with the host board 110; a side wall front detent 318f, 318g on each of the side walls 316a, 316b that is configured to engage with the forward receptacle frame 370; a pair of side wall tray detents 318h, 318i on each of the side walls 316a, 316b that are configured to engage with the shield tray 320; a side wall module projection 318j, 318k on each of the side walls 316a, 316b that is configured to engage the outermost bypass connector modules 120 within the receptacles 106; and an array of partition slits 318l that are configured to engage the receptacle partitions 340.

Figure 40:
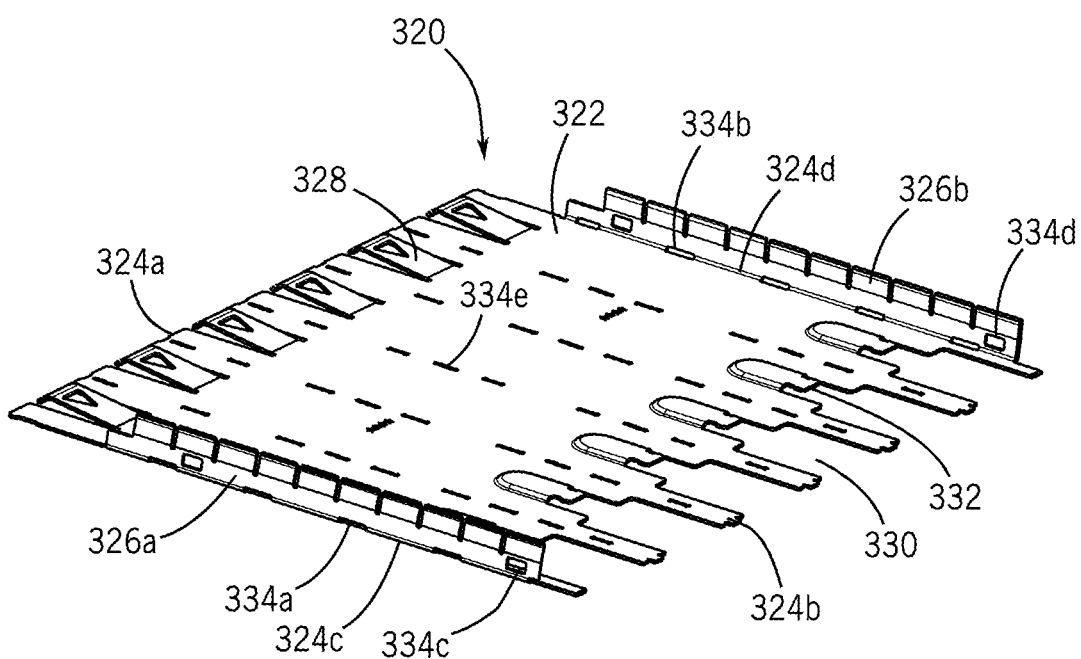
FIG. 40 is an isometric view of a shield tray of the shield assembly of FIGS. 34-38 according to an example embodiment.
Figure 41:
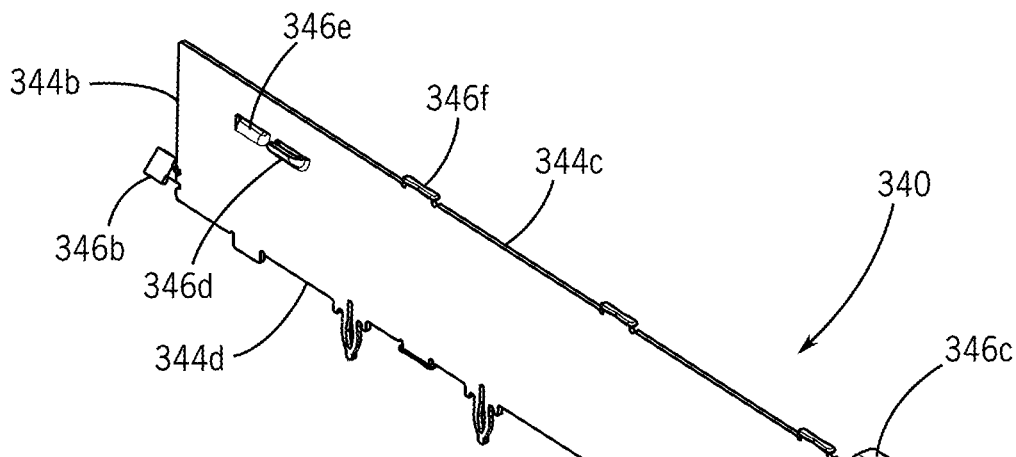
FIG. 41 is an isometric view of a receptacle partition of the shield assembly of FIGS. 34-38 according to an example embodiment.

Briefly, additional details about the shield tray 320 are discussed with reference to the isolated view of FIG. 40. In this example, the shield tray 320 is formed by a relatively planar base plate 322 that may be considered to have a front edge 324a, a rear edge or portion 324b, and side edges 324c, 324d. The shield tray 320 further includes side walls 326a, 326b that extend from the side edges 324c, 324d of the base plate 322. The shield tray 320 includes an array of leaf springs or pliant elements 328 proximate to the front edge 324a of the base plate 322. Upon assembly, the pliant elements 328 facilitate the placement and securement of the plugs 104 (FIG. 2) into the receptacles 106, and as such, one pliant element 328 is provided for each receptacle 106. On the other end of the base plate 322, an array of connector module apertures 330 and connector module mating projections 332 extend across the rear edge 324b of the base plate 322. One connector module aperture 330 and one connector module mating projection 332 are provided for each receptacle 106 upon assembly. As described in greater detail below, the connector module apertures 330 and connector module mating projections 332 support placement of the bypass connector module 120 in each receptacle 106. In particular, the connector module aperture 330 accommodates the terminal sets 210, 230 extending from the bypass connector modules 120 into the host board 110, and the connector module mating projection 332 functions to position and secure the bypass connector module 120 in the receptacle 106. The shield tray 320 further includes one or more mating features 334a-334e, including an array of side edge slots 334a, 334b extending along the side edges 324c, 324d of the base plate 312 that are configured to receive the side wall mounting pegs 318d, 318e of the upper shield cover 310; one or more side wall slots 334c, 334d in each of the side walls 326a, 326b that are configured to engage the side wall tray detents 318h, 318i of the upper shield cover 310; and a number of rows of partition slots 334e, each row extending longitudinally across the base plate 322 that are configured to support the receptacle partitions 340 that define the receptacles 106.

The shield assembly 122 further includes a number of the receptacle partitions 340 that separate adjacent plug receptacles 106. As such, in this example, there are five (5) receptacle partitions 340 to at least partially define the six plug receptacles 106. Additional details of the receptacle partitions 340 may be discussed with reference to FIG. 41, which is an isolated view of the receptacle partition 340. As shown, the partition 340 may be considered to include a body 342 having a forward edge 344a, a rear edge 344b, a top edge 344c, and a bottom edge 344d. The receptacle partitions 340 include a number of mating features 346a-346c, including an array of mounting pegs 346a extending across the bottom edge 344d that are configured to pass through the partition slots 334e of the shield tray 320 and into the host board 110; at least one rear tab 346b extending from the rear edge 344b that is configured to pass through the rear shield plate 350 and be bent to secure the partition 340 to the rear shield plate 350; at least one frame tab 346c extending from the top edge 344c proximate to the front edge 344a that is configured to engage the receptacle frame 370; one or more module projections 346d, 346e extending generally laterally from each face of the body 342 proximate to the rear edge 344b that are configured to engage the bypass connector module 120 on either side of the receptacle partition 340; one or more top edge tabs 346f extending along the top edge 344 for engagement with the upper shield cover 310; and one or more bottom edge tabs 346g for engagement with the shield tray 320.

Figure 42:
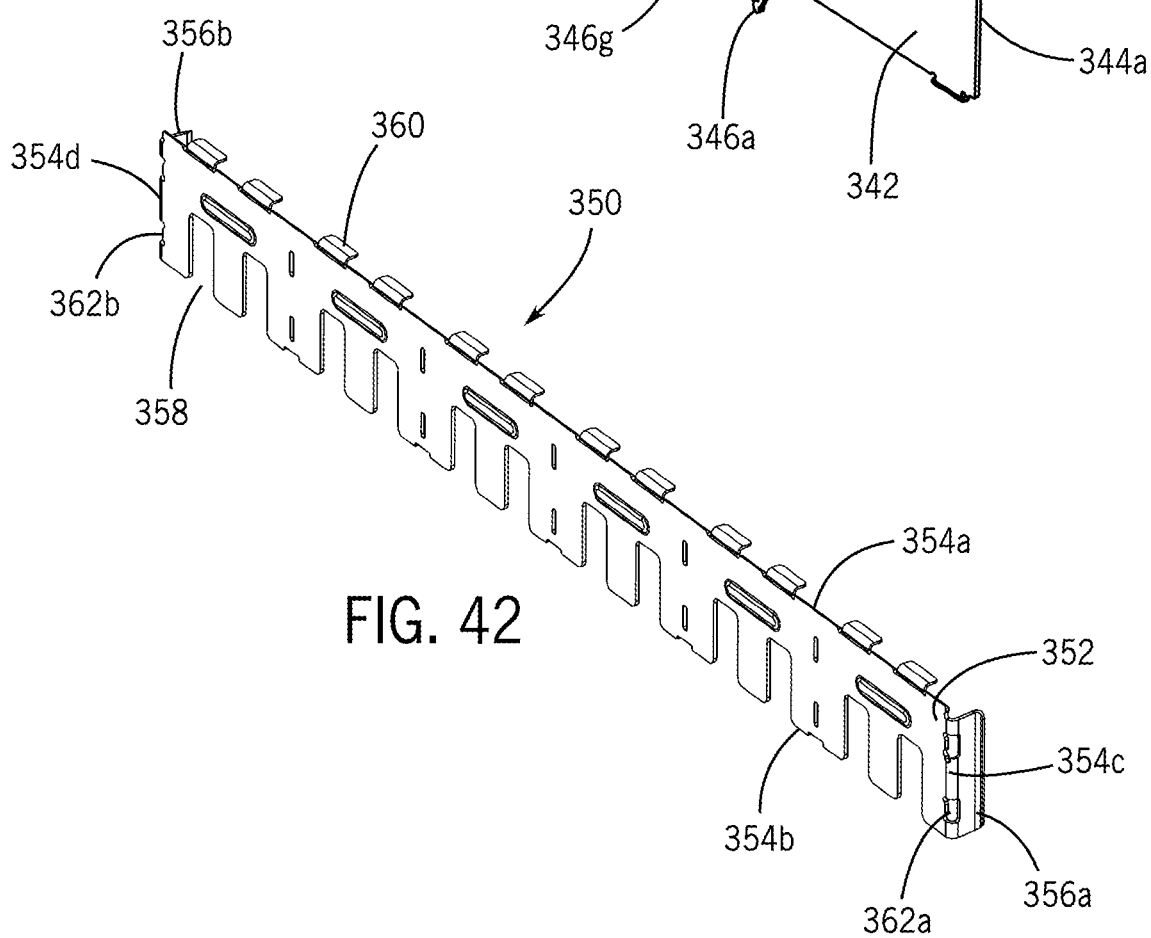
FIG. 42 is an isometric view of a rear shield plate of the shield assembly of FIGS. 34-38 according to an example embodiment.

Reference is now made to FIG. 42, which is an isolated isometric view of the rear shield plate 350. The rear shield plate 350 may be considered to include a body 352 with a top edge 354a, a bottom edge 354b, and a pair of side edges 354c, 354d. A side wall 356a, 356b extends in a forward direction from each of the side edges 354c, 354d. A series of cable apertures 358 extend from the bottom edge 354b into the interior of the body 352. Each of the cable apertures 358 is sized to accommodate a single cable 112, and the cable apertures 358 collectively cooperate with the individual rear shields 280 to provided shielding for the cables 112 and the rear of the bypass connector modules 120. A row of top edge tabs 360 extend along the top edge 354a of the rear shield plate 350, and one or more side slots 362a, 362b are positioned on each side edge 354c, 354d, each of which are configured to mate with the upper shield cover 310. A series of ridges may extend along the length of the rear shield plate 350 to provide a stiffening function.

Figure 43:
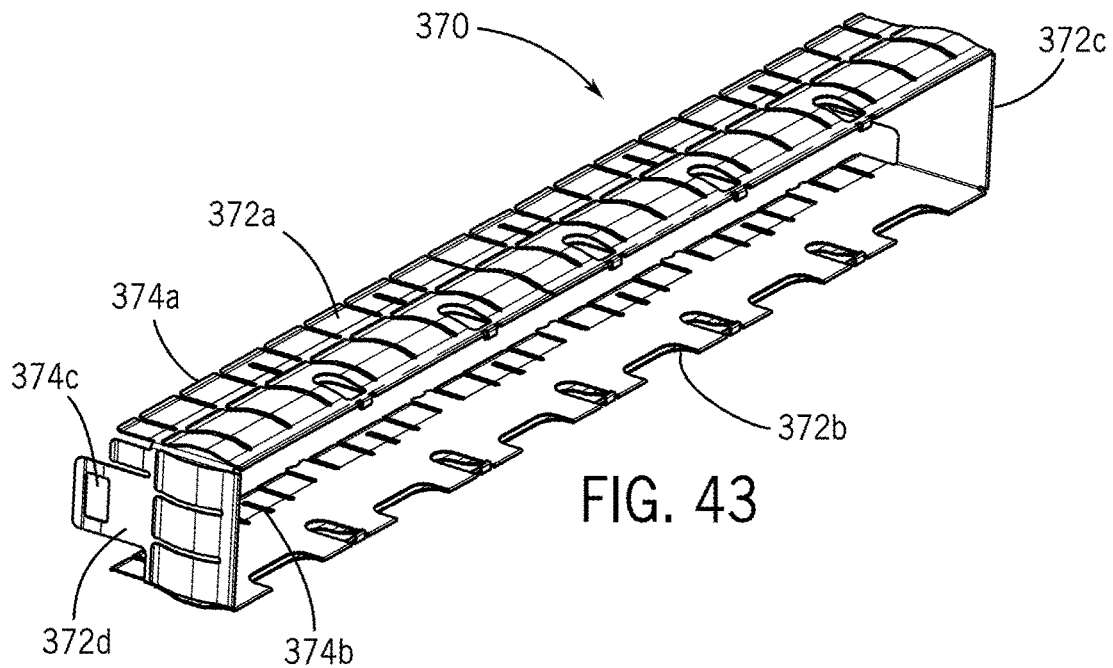
FIG. 43 is an isometric view of a receptacle frame of the shield assembly of FIGS. 34-38 according to an example embodiment.

Reference is now made to FIG. 43, which is an isolated isometric view of the receptacle frame 370, which may be considered to include by a top side 372a, a bottom side 372b, and side walls 372c, 372d that collectively frame the set of receptacles 106 upon assembly. As shown, the receptacle frame 370 may further include top and bottom mounting slots 374a, 374b that may mate with top edge tabs 346c (FIG. 41) when assembled and a side mounting slot 374c (only one of which is visible in FIG. 43) on each side wall 372c, 372d that mates with the frame detents 318f, 318g of the upper shield cover 310 to secure the receptacle frame 370 within the shield assembly 122.

Figure 44:
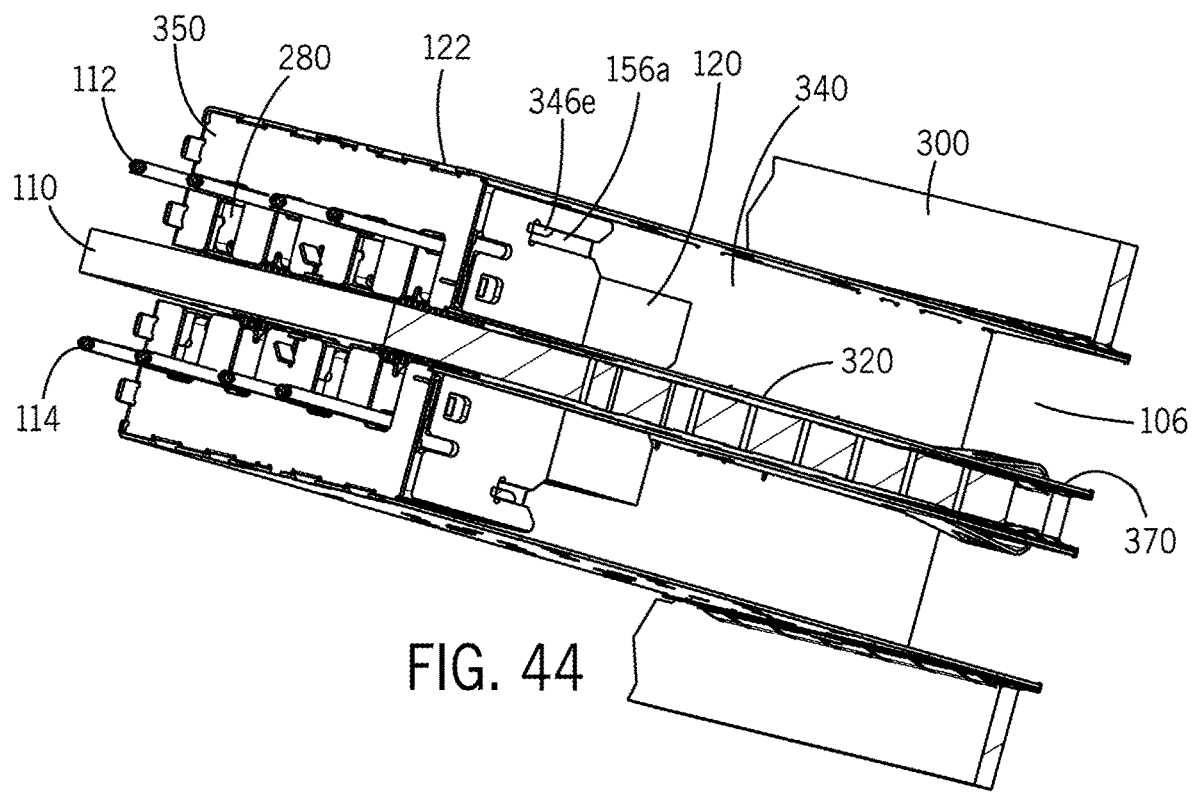
FIG. 44 is a partial cross-sectional view of the electronic device of FIG. 1 according to an example embodiment.

An additional view of the bypass connector module 120 secured within a receptacle 106 is provided by the cross-sectional view of FIG. 44. As shown, the bypass connector module 120 is positioned at the rear of the receptacle 106, ready to receive a plug 104 (FIG. 2) and shielded by the shield assembly 122, including the module rear shield 280, front plate 300, upper shield cover 310, shield tray 320, receptacle partitions 340, and rear shield plate 350. The view of FIG. 44 additional depicts the engagement of the side wall mating slot 156a of the module housing 140 with the module projection 346e of the receptacle partition 340. Interaction between the side wall mating slot 156a of the module housing 140 with the module projection 346e of the receptacle partition 340 provides a "stop" to ensure that the module 120 is appropriately positioned within the receptacle 106.

As such, the shield assembly 122 may be formed around the array of bypass connector modules 120 in order to protect the signals within the electronic device 100. Any suitable assembly procedure may be utilized. However, in one example, initially, the bypass connector modules 120 with the individual rear shields 280 are secured to the shield tray 320 (e.g., as discussed above with reference to FIGS. 5-7 and 40); subsequently, the receptacle partitions 340 are placed onto the shield tray 320 in between the bypass connector modules 120, thereby forming the receptacles 106 (e.g., as discussed above with reference to FIGS. 40 and 41); further, the shield cover 310 may be positioned over the receptacles 106 to engage with the shield tray 320 (e.g., as discussed above with reference to FIGS. 34-40); subsequently, the rear shield plate 350 is positioned on the rear of the shield cover 310 to at least partially surround the cables 112 extending from the bypass connector modules 120 (e.g., as discussed above with reference to FIGS. 36-39 and 42); and further, the receptacle frame 370 is positioned on the front of the shield cover 310 and shield tray 320 (e.g., as discussed above with reference to 36-41 and 43). At this point, the shield assembly 122 and array of bypass connector modules 120 may be mounted on the host board 110, as will now be discussed with reference to FIGS. 45 and 46.

Figure 45:
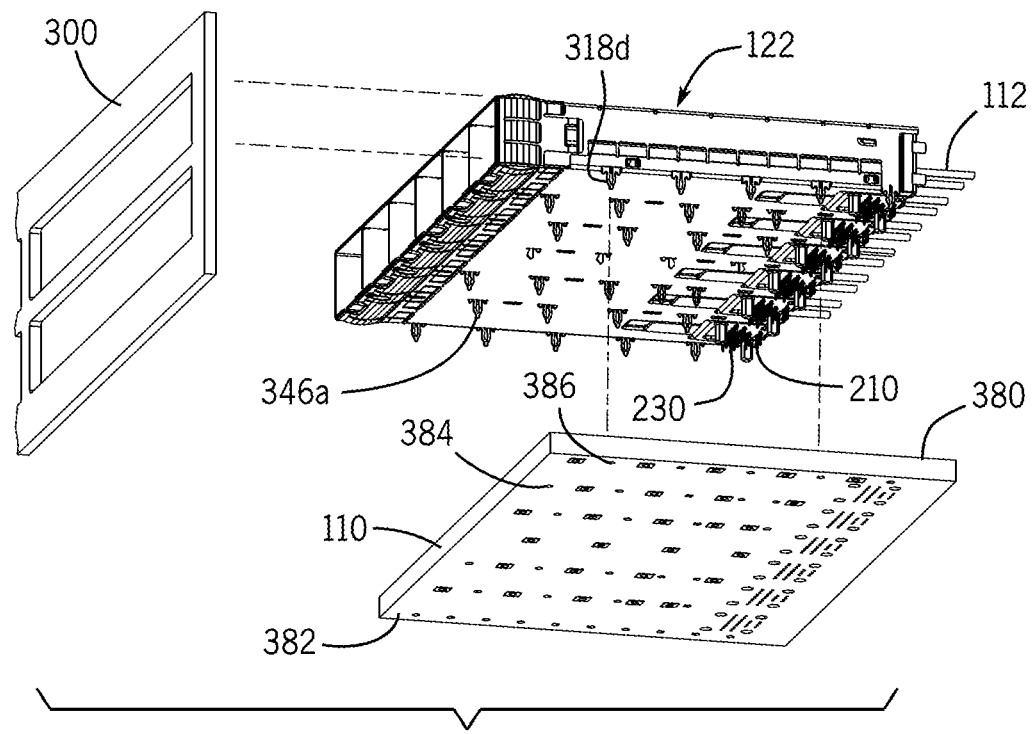
FIG. 45 is a first isometric view of an assembly step of the electronic device of FIG. 1 according to an example embodiment.
Figure 46:
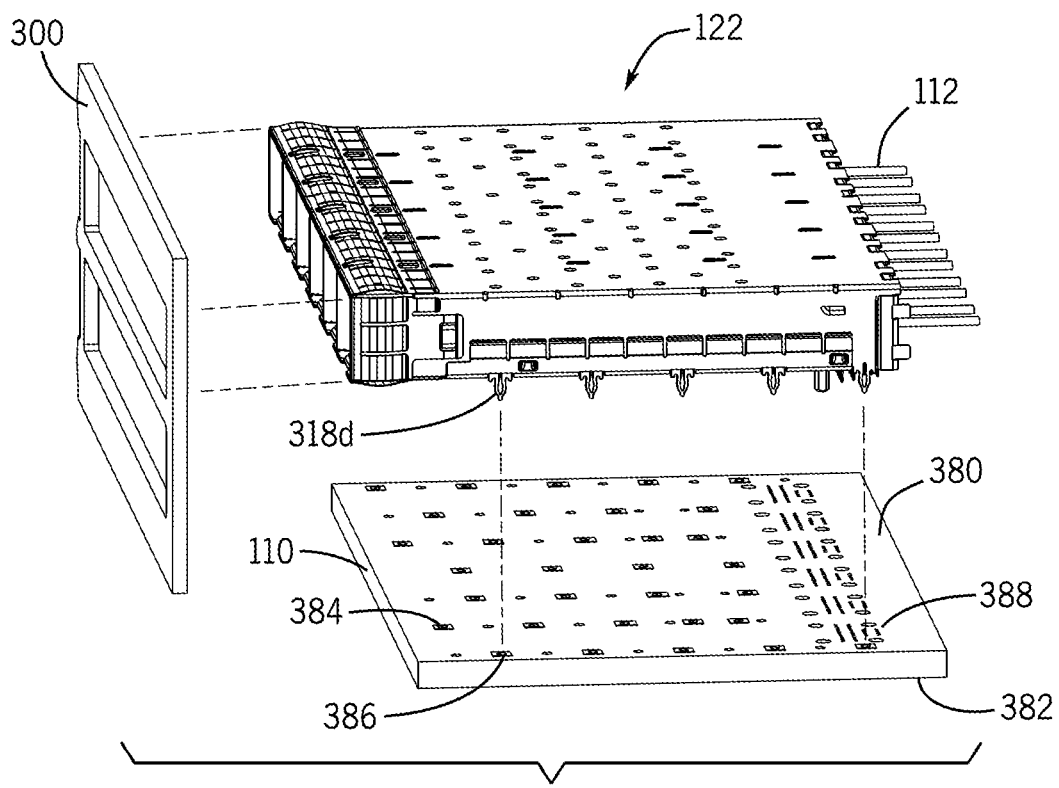
FIG. 46 is a further isometric view of an assembly step of the electronic device of FIG. 1 according to an example embodiment.

As shown, FIGS. 45 and 46 are partially exploded isometric views of the shield assembly 122 and bypass connector modules 120 prior to being mounted on the host board 110. In one example, the host board 110 may be considered to form an upper face 380 and a lower face 382. As noted above, the first shield assembly 122 and bypass connector modules 120 are positioned on the upper face 380 of the host board 110, and the second shield assembly 124 and associated modules (not shown in FIGS. 45 and 46) are positioned on the lower face 382 of the host board 110. As the first shield assembly 122 and bypass connector modules 120 are pressed onto the upper face 380 of the host board 110, the upper shield cover mounting pegs (e.g., pegs 318d) and the partition pegs (e.g., pegs 318d) are received in corresponding peg slots (e.g., peg slots 384, 386). Moreover, the pins of the terminal arrangement (e.g., pins of terminals sets 210, 230) are pressed into corresponding pin contacts (e.g., pin contacts or vias 388) such that the signals and/or power of the terminal sets 210, 230 may be transmitted to the processing features of the host board 110, while the high speed signals are transmitted via cables 112 to a location other than the host board 110 (e.g., external connection assemblies 116, 118). Additionally, the pegs 262c, 262d on the underside of the tail alignment structure 250 may also be received in corresponding holes in the host board 110 in order to facilitate proper placement of the modules 120 relative to the host board 110.

Upon securing the first shield assembly 122 and bypass connector modules 120 to the upper face 380 of the host board 110, a similar operation may occur one the lower face 382 of the host board 110, which may be followed by securing the front plate 300 to the electronic device 100.

As noted above, the pins of the terminal sets 210, 230 extending from the bypass connector modules 120 form an eye-of-the-needle (EON) type engagement with the pin contacts 388 of the host board 110. Such EON compliant pin connectors are typically used in high performance computing systems and may circumvent a need for use of high stress soldering operations involving complex solder compositions, tools, fixtures, and processes. Typically, EON engagement may be challenging due to issues with maintaining pin alignment and bounding out of position. However, due to the various mating features discussed above (e.g., the wafers 170, 190 ensuring proper stacking and alignment; the overmold structures 270, 272 solidifying the interior of the connector modules 120 and the terminal sets 210, 230; and the three-dimensional support of the terminal sets 210, 230 within the tail alignment structure 250) misalignment of the tails 216, 236 that engage with the host board 110 may be prevented or mitigated.

Figure 47:
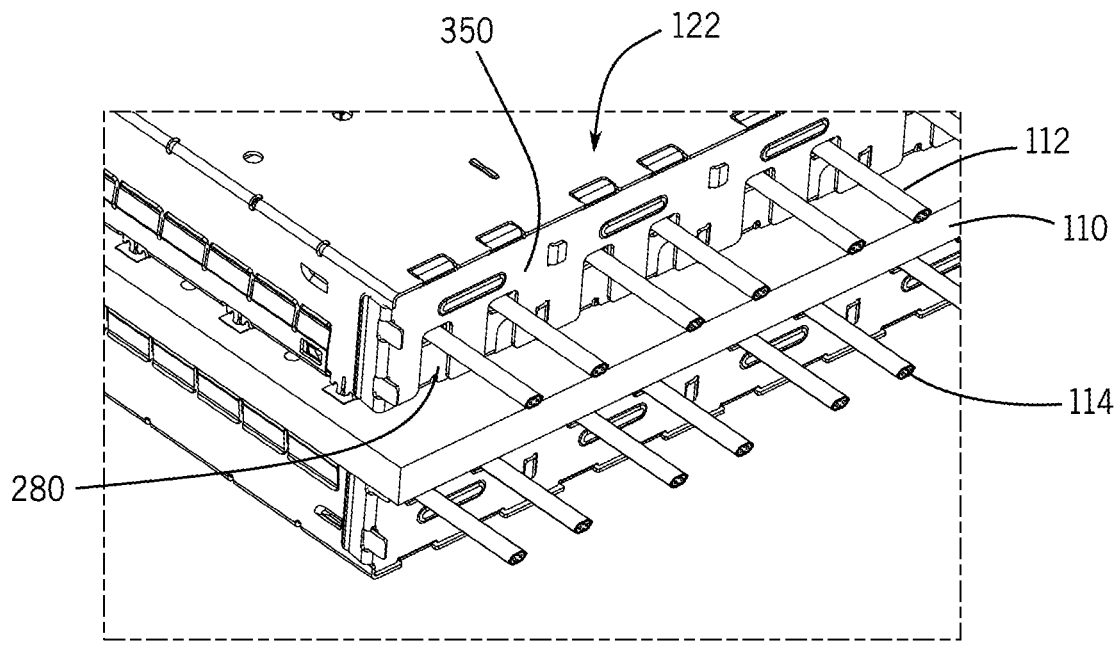
FIG. 47 is a partial end view of the electronic device of FIG. 1 according to an example embodiment.
Figure 48:
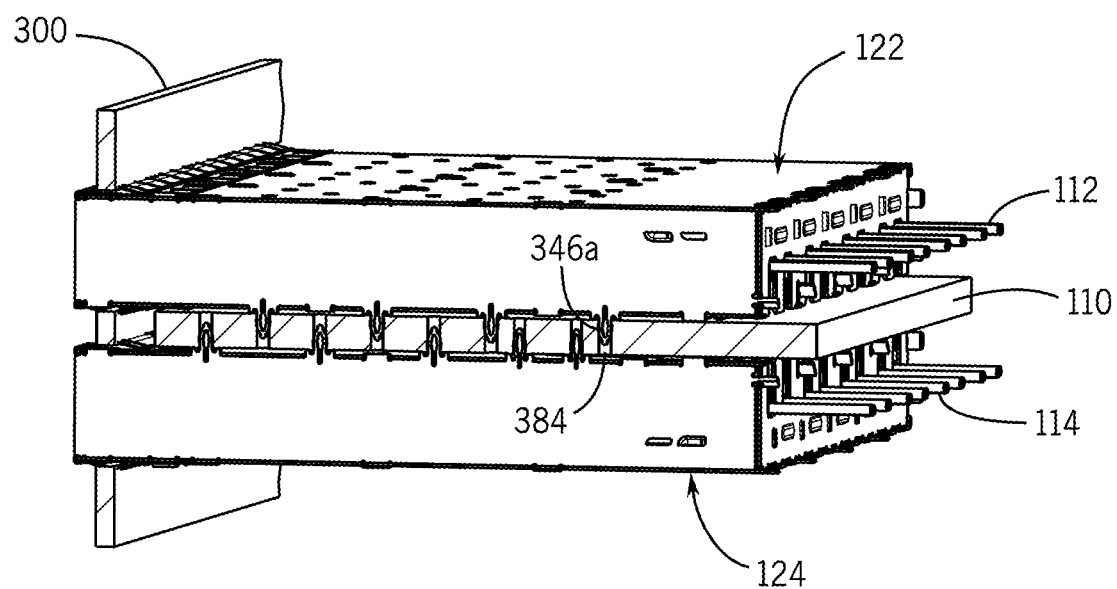
FIG. 48 is a cross-sectional view of the electronic device of FIG. 1 according to an example embodiment.

Additional views are provided in FIGS. 47 and 48. As shown in the partial rear isometric view of FIG. 47, the first shield assembly 122 operates to provide shielding to the bypass connector modules 120 (not visible in FIG. 47) while accommodating the cables 112 extending out of the shield assembly 122. In particular, the individual shields 280 and rear shield plate 350 cooperate to cover all four sides of the cable 112, thereby avoiding or mitigating gaps in the shield assembly 122. The cross-sectional view of FIG. 48 provides additional details regarding the interaction between the array of pegs (e.g., peg 346a) from the shield assembly 122 and the peg slots (e.g., slot 384) in the host board 110, which functions to not only secure the shield assembly 122 to the host board 110, but also to facilitate proper alignment of the connector modules 120 to the host board 110.

Figure 49:
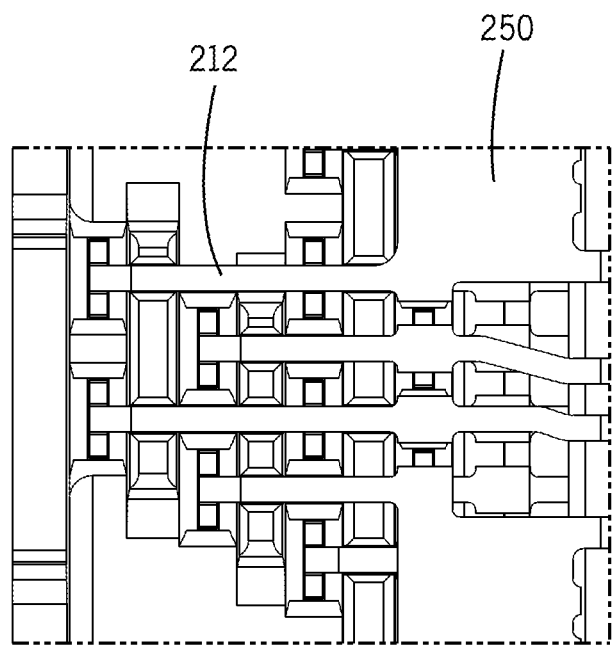
FIG. 49 is a first view of terminal tails mating with a host board within the electronic device of FIG. 1 according to an example embodiment.
Figure 50:
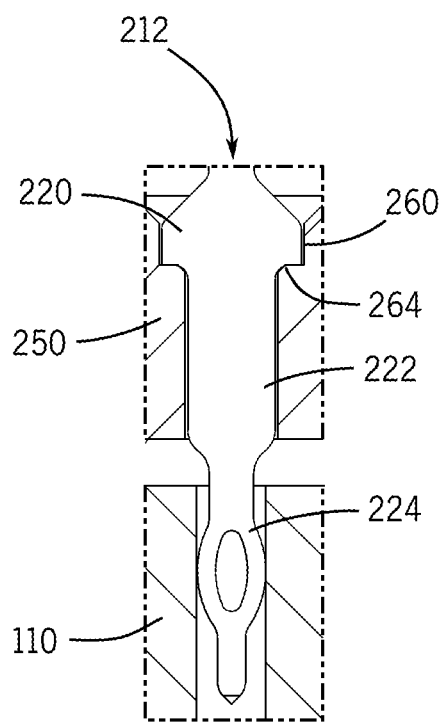
FIG. 50 is a second view of terminal tails mating with a host board within the electronic device of FIG. 1 according to an example embodiment.
Figure 51:
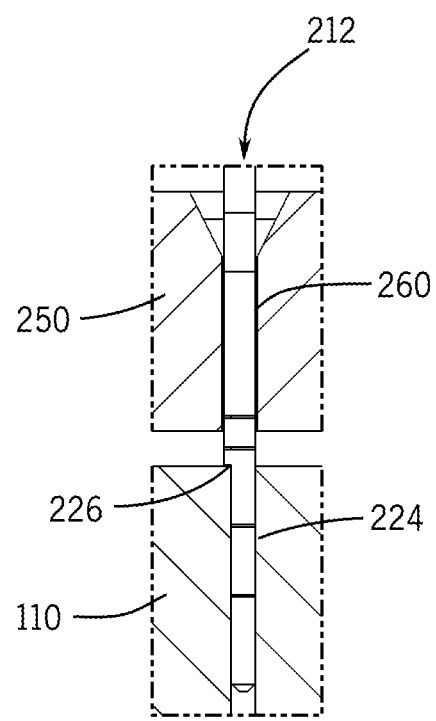
FIG. 51 is a first view of terminal tails mating with a host board within the electronic device of FIG. 1 according to an example embodiment.

Additional details about the terminal arrangements are provided in the views of FIGS. 49-51. The view of FIG. 49 is generally a top of the terminals 212 bending into the tail alignment structure 250, while FIGS. 50 and 51 are cross-sectional orthogonal side views of portions of the terminal 212 extending from the tail alignment structure 250 into the host board 110. As introduced above, and particularly referencing FIG. 50, each tail 216 of the terminal 212 may include the shoulder 220 and narrowed section 222 extending through the tail slot 260 and the pin 224 received by the host board 110. The shoulder 220 may be abut a step 264 in the tail slot 260 to ensure proper positioning. As best shown in FIG. 51, the terminal 212 may also have a step (or further shoulder) 226 proximate to the terminal pin 224 that engages the top of the host board 110, further providing appropriate positioning, including prevention of potential interference between the pin 224, tail slot 260, and pin contacts 388.

Accordingly, the example embodiments discussed herein provide electronic devices with array of shielded bypass connector modules to receive and appropriately transfer high speed and low speed data in a "hybrid" manner to the host board or other connections, off the host board as a bypass, thereby avoiding overloading or being limited by the host board.

The detailed description herein describes exemplary embodiments and is not intended to be limited to the expressly disclosed combination(s). Therefore, unless otherwise noted, features disclosed herein may be combined together to form additional combinations that were not otherwise shown for purposes of brevity. As such, references to a feature or aspect are intended to describe a feature or aspect of an example, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An electronic device, comprising:
a first connector module with a first longitudinal end, a second longitudinal end, a first normal face, and a second normal face, wherein the first connector module is configured to mate with an external plug at the first longitudinal end, the first connector module comprising:
a first set of terminals, each terminal of the first set of terminals having a first end and a second end;
a first wafer supporting the first set of terminals such that the first ends of the first set of terminals are positioned for engagement with the external plug at the first longitudinal end, wherein a first one or more of the second ends of the first set of terminals are bent to form a first set of tails, and a second one or more of the second ends of the first set of terminals terminate within the first wafer; and
a tail alignment structure positioned proximate to the first wafer to receive and support the first set of tails as the first set of tails extend out of the second normal face of first connector module;
a cable arrangement forming a connection with the second one or more of the second ends of the first set of terminals and extending out of the second longitudinal end of the first connector module;
a host board positioned proximate to the second normal face of the first connector module and configured to form an electrical connection with the first set of tails; and
a shield assembly surrounding at least the first longitudinal end, the second longitudinal end, and the first normal face of the first connector module as the first set of tails of the first connector module are engaged with the host board.

2. The electronic device of claim 1, wherein the first connector module is a small form-factor pluggable (SFP) interface.

3. The electronic device of claim 1, wherein the first set of tails engage the host board as an eye-of-the-needle (EON) connection.

4. The electronic device of claim 1, wherein the first one or more of the second ends of the first set of terminals are configured to transmit low speed data or power from the external plug to the host board, and the second one or more of the second ends of the first set of terminals are configured to transmit high speed data from the external plug to the cable arrangement outside of the host board.

5. The electronic device of claim 1, wherein the first connector module further comprises a module housing in which the first wafer and the tail alignment structure are stacked such that an underside of the tail alignment structure forms the second normal face of the first connector module.

6. The electronic device of claim 5, wherein the first connector module further comprises:
- a second set of terminals arranged with the module housing, each terminal of the second set of terminals having a first end and a second end; and
- a second wafer arranged with the module housing and supporting the second set of terminals such that the first ends of the second set of terminals are positioned for engagement with the external plug at the first longitudinal end, wherein at least a portion of the second ends of the second set of terminals are bent to form a second set of tails,
- wherein the second wafer is stacked with the first wafer and the tail alignment structure within the module housing such that the tail alignment structure additionally receives and supports the second set of tails as the second set of tails extend out of the second normal face of first connector module.

7. The electronic device of claim 6, wherein the first wafer is stacked on top of the second wafer relative to the tail alignment structure.

8. The electronic device of claim 7, wherein the first connector module further comprises one or more overmold sections formed on the first and second wafers and the first and second set of terminals.

9. The electronic device of claim 8, wherein the first one or more of the second ends of the first set of terminals are bent at 90° to form the first set of tails, and wherein the at least a portion of the second ends of the second set of terminals are bent at 90° to form the second set of tails.

10. The electronic device of claim 1, further comprising an array of the first connector modules arranged within the shield assembly.

11. The electronic device of claim 10, wherein the shield assembly comprises a shield tray in between at least a portion of the array of first connector modules and the host board, and a shield cover that overlays the array of first connector modules with side walls that mate with the shield tray.

12. The electronic device of claim 11, wherein the shield assembly further comprises an individual rear shield for each of the first connector modules, and a rear shield plate that shields the second longitudinal ends of the first connector modules while accommodating passage of the cable arrangement out of the first connector modules.

13. The electronic device of claim 12, wherein the shield assembly further comprises a plurality of shield partitions, each of the shield partitions arranged in between adjacent first connector modules of the array of first connector modules.

14. The electronic device of claim 13, wherein the shield partitions extend between the shield tray and the shield cover to define a series of plug receptacles.

15. The electronic device of claim 1, wherein each tail of the first set of tails includes a shoulder that abuts a corresponding shoulder in the tail alignment structure to position the first set of tails relative to the tail alignment structure.

* * * * *